United States Patent
Cho et al.

(10) Patent No.: US 11,552,655 B2
(45) Date of Patent: Jan. 10, 2023

(54) DIGITAL RADIO FREQUENCY TRANSMITTER AND WIRELESS COMMUNICATION DEVICE INCLUDING THE SAME

(71) Applicant: Samsung Electronics Co., Ltd., Suwon-si (KR)

(72) Inventors: Youngsea Cho, Seongnam-si (KR); Jiseon Paek, Suwon-si (KR); Wan Kim, Uiwang-si (KR); Daechul Jeong, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 17 days.

(21) Appl. No.: 17/196,463

(22) Filed: Mar. 9, 2021

(65) Prior Publication Data

US 2021/0367624 A1   Nov. 25, 2021

(30) Foreign Application Priority Data

May 25, 2020   (KR) .................. 10-2020-0062578

(51) Int. Cl.
  *H04B 1/00*  (2006.01)
  *H04B 1/16*  (2006.01)
  *H04B 1/62*  (2006.01)

(52) U.S. Cl.
  CPC ......... *H04B 1/0017* (2013.01); *H04B 1/1676* (2013.01); *H04B 1/62* (2013.01)

(58) Field of Classification Search
  CPC ...... H04B 1/0017; H04B 1/1676; H04B 1/62; H04B 1/0458; H04B 1/0475; H04B 1/44; H04B 1/04; H04B 1/0007; H04B 2001/0408; H03F 1/32; H03F 3/24; H03F 1/0244; H03F 2200/387; H03F 2200/336; H03F 2200/267; H03F 2200/451; H03F 2200/456; H03F 3/2173; H03F 3/245; H03M 1/0614; H03M 1/66
  See application file for complete search history.

(56) References Cited

U.S. PATENT DOCUMENTS

| | | | |
|---|---|---|---|
| 7,986,192 B2 | 7/2011 | Lee et al. | |
| 8,976,897 B2 | 3/2015 | Vora et al. | |
| 9,444,500 B2 | 9/2016 | Wang et al. | |
| 10,009,050 B2 | 6/2018 | Chen et al. | |

(Continued)

FOREIGN PATENT DOCUMENTS

KR   10-1651201 B1   8/2016

*Primary Examiner* — Sam K Ahn
*Assistant Examiner* — Amneet Singh
(74) *Attorney, Agent, or Firm* — Harness, Dickey & Pierce, P.L.C.

(57) ABSTRACT

A digital radio frequency (RF) transmitter including processing circuitry configured to generate first through third pattern signals based on a pattern of an inphase (I)-quadrature (Q) binary data pair and a pattern of an inverted I-Q binary data pair, the first through third pattern signals having a same pattern and different phases, and a switched-capacitor digital-to-analog converter (SC-DAC) configured to remove an n-th harmonic component of an RF analog signal by amplifying the first through third pattern signals to have a certain magnitude ratio and synthesizing the amplified first through third pattern signals into the RF analog signal, where "n" is an integer of at least 3, may be provided.

15 Claims, 32 Drawing Sheets

(56) References Cited

U.S. PATENT DOCUMENTS

| | | | |
|---|---|---|---|
| 10,158,392 B2 | 12/2018 | Obiya et al. | |
| 10,200,232 B1 | 2/2019 | Wentzloff et al. | |
| 10,230,408 B2 | 3/2019 | Al-Qaq et al. | |
| 2014/0269991 A1* | 9/2014 | Aparin | H04B 15/04 |
| | | | 375/296 |
| 2019/0207565 A1* | 7/2019 | de Vreede | H04B 1/0483 |
| 2019/0288653 A1* | 9/2019 | Yoo | H04B 1/0007 |

* cited by examiner

DIGITAL RADIO FREQUENCY TRANSMITTER AND WIRELESS COMMUNICATION DEVICE INCLUDING THE SAME

CROSS-REFERENCE TO RELATED APPLICATION

This application claims priority under 35 U.S.C. § 119 to Korean Patent Application No. 10-2020-0062578, filed on May 25, 2020, in the Korean Intellectual Property Office, the disclosure of which is incorporated herein in its entirety by reference.

BACKGROUND

The inventive concepts relate to digital radio frequency (RF) transmitters for reducing or minimizing an intermodulation distortion component caused by non-linear amplification of an amplifier at the time when an RF analog signal is generated and more particularly, to digital RF transmitters and/or wireless communication devices including the same.

Recently, wireless communication systems have been developed from single mode systems to systems, such as second generation (2G), third generation (3G), fourth generation (4G), and fifth generation (5G) systems, which simultaneously support multiple bands and/or modes. To support multiple bands and/or modes, wireless communication systems need to communicate via a frequency band corresponding to each standard, while attenuating signals in other frequency bands to reduce or minimize an influence on the other frequency bands. According to the related art, a digital RF transmitter of a wireless communication device operates based on a non-linear amplifier, and accordingly an unwanted harmonic component may be generated. Thus, an intermodulation distortion component may be generated due to the non-linearity of a power amplifier when an RF analog signal including the harmonic component passes through the power amplifier.

A filter is provided at the front or back end of the power amplifier to remove the intermodulation distortion component. However, the number of filters exponentially increases because recent wireless communication systems need to cover up to the millimeter-wave band, and accordingly cost and a layout area increase.

SUMMARY

The inventive concepts provide digital radio frequency (RF) transmitters including a structure for blocking an intermodulation distortion component occurring due to non-linear amplification and/or wireless communication devices including the digital RF transmitter.

According to an aspect of the inventive concepts, a digital RF transmitter may include processing circuitry configured to generate first through third pattern signals based on a pattern of an inphase (I)-quadrature (Q) binary data pair and a pattern of an inverted I-Q binary data pair, the first through third pattern signals having a same pattern and different phases, and the I-Q binary data pair resulting from conversion of a baseband signal, and a switched-capacitor digital-to-analog converter (SC-DAC) configured to remove an n-th harmonic component of an RF analog signal by amplifying the first through third pattern signals to have a certain magnitude ratio and synthesizing the amplified first through third pattern signals into the RF analog signal, where "n" is an integer of at least 3.

According to another aspect of the inventive concepts, a wireless communication device may include a modem configured to modulate digital data and output "k" bits of I data, "k" bits of Q data, "k" bits of inverted I data, and "k" bits of inverted Q data, where "k" is an integer of at least 2, a digital RF transmitter configured to generate a first pattern signal having a pattern corresponding to a pattern of an I-Q binary data pair and a pattern of an inverted I-Q binary data pair, the I-Q binary data pair and the inverted I-Q binary data pair being generated based on thermometer-to-binary conversion on the I data, the Q data, the inverted I data, and the inverted Q data, and remove an n-th harmonic component of an RF analog signal by generating a second pattern signal and a third pattern signal, the second pattern signal having a first phase difference from the first pattern signal, and the third pattern signal having a second phase difference from the first pattern signal, where "n" is an integer of at least 3, and a power amplifier configured to receive the RF analog signal and to generate an RF output signal by amplifying the RF analog signal, the RF analog signal being generated by summing the first through third pattern signals.

According to a further aspect of the inventive concepts, a wireless communication device may include a first SC-DAC circuit including a plurality of first paths, each including a first amplifier and a first capacitor, the first SC-DAC circuit configured to receive a plurality of first pattern signals in parallel and output a first RF signal by summing the plurality of first pattern signals, a second SC-DAC circuit including a plurality of second paths, each including a second amplifier and a second capacitor, the second SC-DAC circuit configured to receive a plurality of second pattern signals in parallel and output a second RF signal by summing the plurality of second pattern signals, a third SC-DAC circuit including a plurality of third paths, each including a third amplifier and a third capacitor, the third SC-DAC circuit configured to receive a plurality of third pattern signals in parallel and output a third RF signal by summing the plurality of third pattern signals, processing circuitry configured to generate the plurality of first pattern signals based on patterns of I-Q binary data pairs and patterns of inverted I-Q binary data pairs, the plurality of second pattern signals, and the plurality of third pattern signals, the plurality of second pattern signals lagging the plurality of first pattern signals by a first phase, and the plurality of third pattern signals lagging the plurality of first pattern signals by a second phase, and a first output terminal connected to an output terminal of each of the first through third SC-DAC circuits and configured to output an RF analog signal by summing the first through third RF signals.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Hereinafter, some example embodiments will be described in detail with reference to the accompanying drawings.

Figure 1:
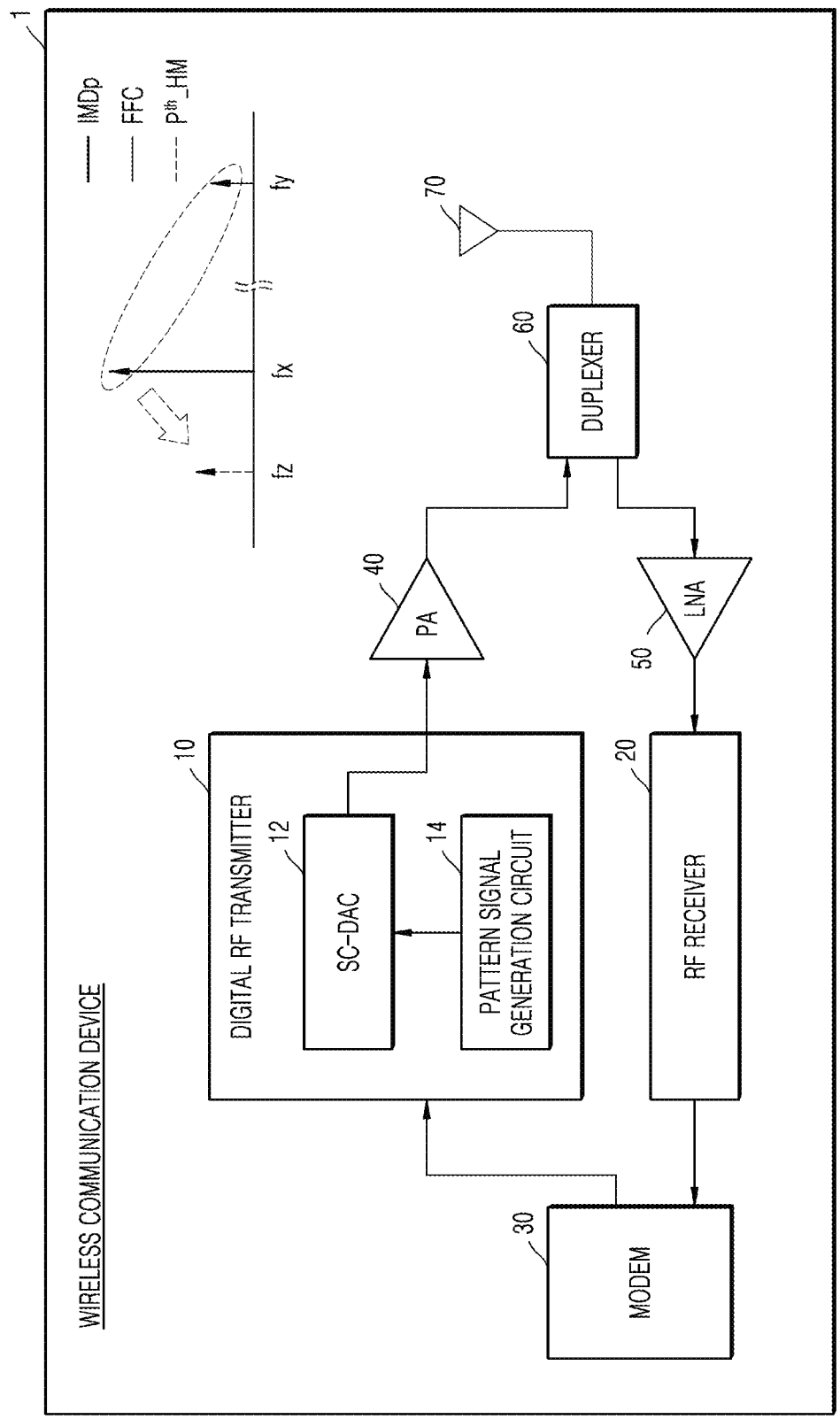
FIG. 1 is a schematic block diagram of a wireless communication device according to an example embodiment.

FIG. 1 is a schematic block diagram of a wireless communication device 1 according to an example embodiment. For convenience of description, a signal output from a digital radio frequency (RF) transmitter 10 may be defined as an RF analog signal, and a signal output from a power amplifier (PA) 40 may be defined as an RF output signal.

Referring to FIG. 1, the wireless communication device 1 may include the digital RF transmitter 10, an RF receiver 20, a modem 30, the PA 40, a low-noise amplifier (LNA) 50, a duplexer 60, and an antenna 70. The wireless communication device 1 may further include a balun (not shown in FIG. 1) between the PA 40 and the duplexer 60, and this will be described in FIG. 2. The modem 30 may modulate a signal for transmission of information (e.g., digital information) and provide a digital signal to the digital RF transmitter 10 and may demodulate a digital signal from the RF receiver 20 to reconstruct an original signal.

The digital RF transmitter 10 may generate an RF analog signal in an RF frequency band from a digital signal from the modem 30 and provide the RF analog signal to the PA 40. The digital RF transmitter 10 may include a switched-capacitor digital-to-analog converter (SC-DAC) 12 and a pattern signal generation circuit 14. In some example embodiments, the digital RF transmitter 10 may include at least one SC-DAC. The SC-DAC 12 may include a plurality of amplifiers and a plurality of capacitors, and may convert a digital signal received from the modem 30 into an analog signal. In an example embodiment, each of the amplifiers of the SC-DAC 12 may be implemented by a switching amplifier including Class D or Class G. Thus, an unwanted p-th harmonic component $p^{th}\_HM$ (where "p" is an integer of at least 2) may be generated when the SC-DAC 12 amplifies a certain signal in a part of an operation of converting a digital signal into an analog signal. Due to non-linearity of the PA 40, an intermodulation distortion component may be generated from the p-th harmonic component $p^{th}\_HM$.

For example, when the SC-DAC 12 generates an RF analog signal corresponding to a digital signal, the RF analog signal may include a fundamental frequency component FFC corresponding to a first frequency fx and the p-th harmonic component $p^{th}\_HM$ corresponding to a second frequency fy. Thereafter, when the RF analog signal is amplified by the PA 40, an intermodulation distortion component IMDp corresponding to a third frequency fz, which is hard to remove using a filter near the first frequency fx, may be generated through intermodulation between the p-th harmonic component $p^{th}\_HM$ and the fundamental frequency component FFC. As described above, although unwanted, the p-th harmonic component $p^{th}\_HM$ may not be removed by a frequency filter (not shown), and thus may produce the intermodulation distortion component IMDp through intermodulation with other harmonic components. In other words, when the RF analog signal, which includes the fundamental frequency component FFC and the p-th harmonic component $p^{th}\_HM$, is output from the SC-DAC 12 and passes through the PA 40 having non-linearity, the intermodulation distortion component IMDp may be undesirably produced by intermodulation. Because the intermodulation distortion component IMDp is not removed by a low-pass filter, and becomes critical noise when an RF output signal is generated, the p-th harmonic component $p^{th}\_HM$ may need to be removed in advance to mitigate or prevent the intermodulation distortion component IMDp from being produced.

According to an example embodiment, the pattern signal generation circuit 14 may remove the p-th harmonic component $p^{th}\_HM$ from an RF analog signal before the RF analog signal of the digital RF transmitter 10 passes through the PA 40. The pattern signal generation circuit 14 may have a configuration associated with the SC-DAC 12 to generate an inverted-phase component, which has an opposite phase to the p-th harmonic component $p^{th}\_HM$ of the RF analog signal and the same magnitude as the p-th harmonic component $p^{th}\_HM$. The inverted-phase component may be added to the p-th harmonic component $p^{th}\_HM$ of the RF analog signal, thereby reducing or removing the p-th harmonic component $p^{th}\_HM$. For example, the SC-DAC 12 may be configured to remove an $p^{th}\_HM$ of the RF analog signal by amplifying first through third pattern signals to have a certain magnitude ratio and synthesizing the amplified first through third pattern signals into the RF analog signal, where "p" is an integer of at least.

In other words, the digital RF transmitter 10 may remove the p-th harmonic component $p^{th}\_HM$ of an RF analog signal using an additionally generated inverted-phase component Like or similarly to the SC-DAC 12, the pattern signal generation circuit 14 may include a plurality of amplifiers and a plurality of capacitors. The pattern signal generation circuit 14 may include capacitors having a desired (or alternatively, predetermined) capacitance such that an inverted-phase component has a magnitude equal or substantially similar to that of the p-th harmonic component $p^{th}\_HM$ of an RF analog signal. Further, signals having a desired (or alternatively, predetermined) phase difference with signals input to the SC-DAC 12 may be input to the pattern signal generation circuit 14 such that the inverted-phase component has an opposite phase to the p-th harmonic component $p^{th}\_HM$ of the RF analog signal. In some example embodiments, a supply voltage having a different level than a supply voltage applied to the SC-DAC 12 may be applied to the pattern signal generation circuit 14 such that the magnitude of the inverted-phase component is as approximate to the magnitude of the p-th harmonic component $p^{th}\_HM$ of the RF analog signal as possible.

The PA 40 may generate an RF output signal by amplifying the RF analog signal, from which the p-th harmonic component $p^{th}\_HM$ has been reduced or removed, and output the RF output signal to the duplexer 60. The antenna 70 connected to the duplexer 60 may emit the RF output signal to a base station or another wireless communication device.

The antenna 70 may receive and transmit an RF analog signal, which is generated according to an example embodiment, to the duplexer 60, and the low-noise amplifier 50 may perform a low-noise amplification with regard to the RF analog signal and provide an amplified RF analog signal to the RF receiver 20. The RF receiver 20 may convert the amplified RF analog signal into a baseband digital signal and provide the baseband digital signal to the modem 30.

According to an example embodiment, the digital RF transmitter 10 may remove the p-th harmonic component $p^{th}\_HM$, which is produced due to non-linear switching amplification, from an RF analog signal in advance, thereby generating an RF output signal, from which an intermodulation distortion component that may be noise afterwards is blocked. Accordingly, the wireless communication device 1 may support improved communication performance.

Hereinafter, descriptions will be focused on the case where the p-th harmonic component $p^{th}\_HM$ is a third harmonic component, for clear understanding. However, this is just an example. According to some example embodiments, an intermodulation distortion component caused by higher order harmonics than third may be blocked.

Figure 2:
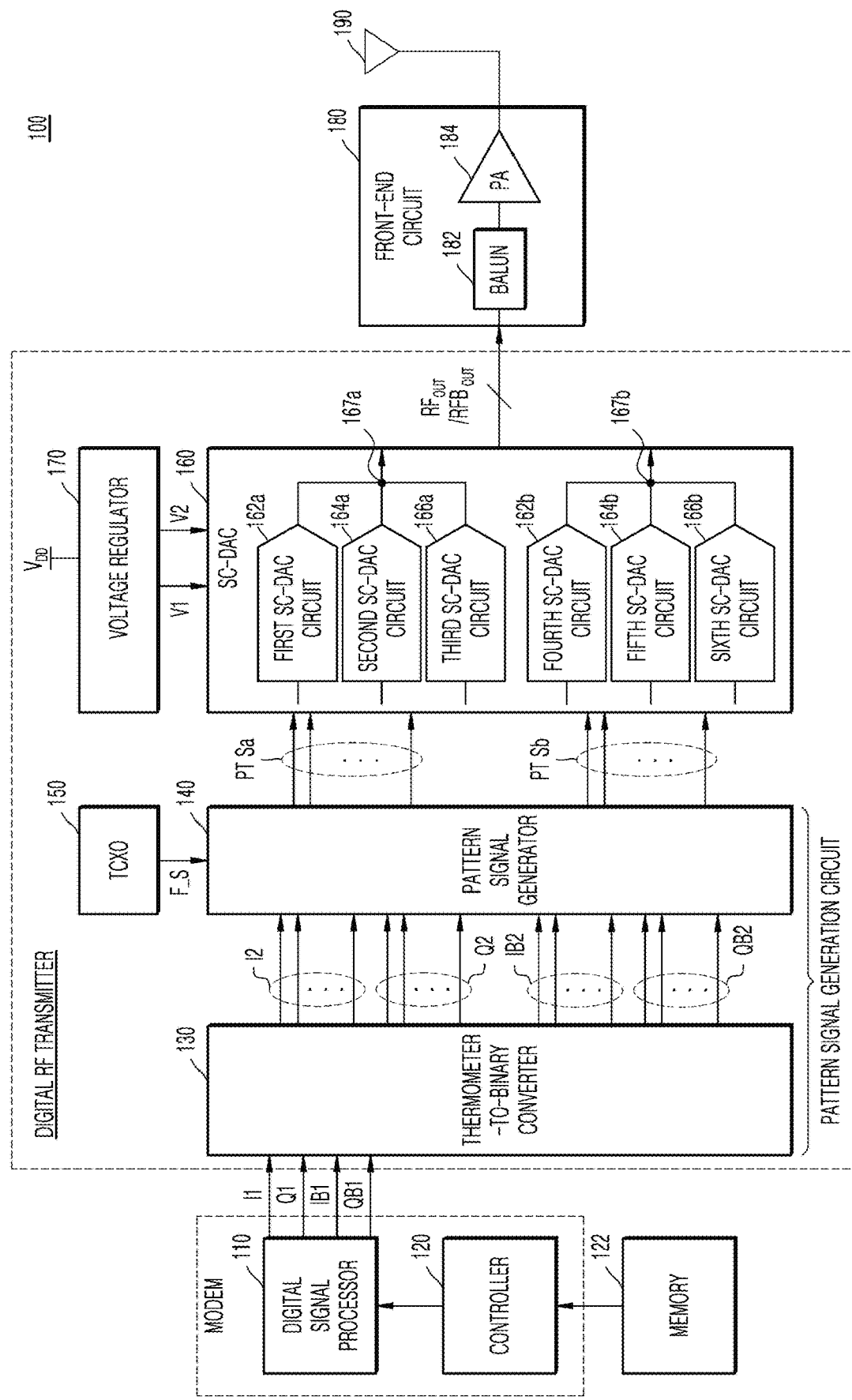
FIG. 2 is a block diagram of a wireless communication device according to an example embodiment.

FIG. 2 is a block diagram of a wireless communication device 100 according to an example embodiment.

Referring to FIG. 2, the wireless communication device 100 may include a digital signal processor 110, a controller 120, a memory 122, a thermometer-to-binary converter 130, a pattern signal generator 140, a crystal oscillator 150, an SC-DAC 160, a voltage regulator 170, a front-end circuit 180, and an antenna 190. The digital signal processor 110, the controller 120, and the memory 122 may form the modem 30 in FIG. 1. The thermometer-to-binary converter 130, the pattern signal generator 140, the crystal oscillator 150, the SC-DAC 160, and the voltage regulator 170 may form the digital RF transmitter 10 in FIG. 1. The thermometer-to-binary converter 130 and the pattern signal generator 140 may form the pattern signal generation circuit 14 in FIG. 1.

The controller 120 may control the operations of the digital signal processor 110 and circuit blocks of the wireless communication device 100 using the memory 122. The digital signal processor 110 may output inphase (I) data I1, quadrature (Q) data Q1, inverted I data IB1, and inverted Q data QB1, each having "k" bits (where "k" is an integer of at least 2), to the thermometer-to-binary converter 130. The thermometer-to-binary converter 130 may perform thermometer-to-binary conversion on the I data I1, the Q data Q1, the inverted I data IB1, and the inverted Q data QB1 and provide I binary data I2, Q binary data Q2, inverted I binary data IB2, and inverted Q binary data QB2 to the pattern signal generator 140. For example, when the I data I1 has three bits "011" and the Q data Q1 has three bits "010", the thermometer-to-binary converter 130 may generate the I binary data I2 by converting the I data I1 into seven bits "0000111" and the Q binary data Q2 by converting the Q data Q1 into seven bits "0000011". The thermometer-to-binary converter 130 may arrange the I binary data I2, the Q binary data Q2, the inverted I binary data IB2, and the inverted Q binary data QB2 bit-by-corresponding bit and provide the I binary data I2, the Q binary data Q2, the inverted I binary data IB2, and the inverted Q binary data QB2 in parallel to the pattern signal generator 140.

The pattern signal generator 140 may generate first and second pattern signal groups PT_Sa and PT_Sb, which include pattern signals having a certain pattern corresponding to a pattern of an I-Q binary data pair and a pattern of an inverted I-Q binary data pair, using a frequency signal F_S received from the crystal oscillator 150 and provide the first and second pattern signal groups PT_Sa and PT_Sb to the SC-DAC 160. For example, when the I binary data I2 is "0000011", the Q binary data Q2 is "0000101", the inverted I binary data IB2 is "1111100", and the inverted Q binary data QB2 is "1111010", the pattern of an I-Q binary data pair corresponding to the last bit may be "11" and the pattern of an inverted I-Q binary data pair corresponding to the last bit may be "00", the pattern of an I-Q binary data pair corresponding to the second last bit may be "10" and the pattern of an inverted I-Q binary data pair corresponding to the second last bit may be "01", the pattern of an I-Q binary data pair corresponding to the third last bit may be "01" and the pattern of an inverted I-Q binary data pair corresponding to the third last bit may be "10", and the pattern of an I-Q binary data pair corresponding to the fourth last bit may be "00" and the pattern of an inverted I-Q binary data pair corresponding to the fourth last bit may be "11". The pattern of an I-Q binary data pair or the pattern of an inverted I-Q binary data pair may be represented with four different expressions, and accordingly, a pattern signal may have four different patterns, which will be described in detail with reference to FIGS. 5A through 5C below. The pattern signal generator 140 described herein may be implemented using hardware components or a combination of software components and hardware component. For example, the hardware components may include microcontrollers, memory modules, sensors, amplifiers, band-pass filters, analog to digital converters, and processing devices, or the like. A processing device may be implemented using one or more hardware device(s) configured to carry out and/or execute program code by performing arithmetical, logical, and input/output operations. The processing device(s) may include processing circuitry, a processor, a controller and an arithmetic logic unit, a digital signal processor, a microcomputer, a field programmable array, a programmable logic unit, a microprocessor or any other device capable of responding to and executing instructions in a defined manner. The processing device(s) may run an operating system (OS) and one or more software applications that run on the OS. The processing device also may access, store, manipulate, process, and create data in response to execution of the software. For purpose of simplicity, the description of a processing device is used as singular. However, one skilled in the art will appreciate that a processing device may include multiple processing elements and multiple types of processing elements. For example, a processing device may include multiple processors or a processor and a controller. In addition, different processing configurations are possible, such as parallel processors, multi-core processors, distributed processing, or the like.

The first pattern signal group PT_Sa may include pattern signals generated based on the pattern of an I-Q binary data pair and the pattern of an inverted I-Q binary data pair, and the second pattern signal group PT_Sb may include pattern signals having opposite phases to the pattern signals of the first pattern signal group PT_Sa. The pattern signal generator 140 may provide in parallel as many pattern signals PT_S as the number of bits in the I binary data I2, the Q binary data Q2, the inverted I binary data IB2, and the inverted Q binary data QB2 to the SC-DAC 160. For example, when each of the I binary data I2, the Q binary data Q2, the inverted I binary data IB2, and the inverted Q binary data QB2 includes seven bits, the pattern signal generator 140 may generate the first pattern signal group PT_Sa including 28 pattern signals and may output the pattern signals in parallel to the SC-DAC 160.

In an example embodiment, the pattern signal generator 140 may generate a clock signal by dividing the frequency signal F_S having a certain frequency and generate a plurality of clock signals, which have a certain phase difference from each other, from the clock signal. The pattern signal generator 140 may generate pattern signals using the clock signals, and this will be described in detail with reference to FIGS. 4 and 11 below.

The SC-DAC 160 may include first through sixth SC-DAC circuits 162a, 164a, 166a, 162b, 164b, and 166b. The first through third SC-DAC circuits 162a through 166a may receive and perform digital-to-analog conversion on the first pattern signal group PT_Sa, and the fourth through sixth SC-DAC circuits 162b through 166b may receive and perform digital-to-analog conversion on the second pattern signal group PT_Sb. The second and third SC-DAC circuits 164a and 166a and the fifth and sixth SC-DAC circuits 164b through 166b may correspond to the pattern signal generation circuit 14 in FIG. 1. Hereinafter, descriptions will be focused on the first through third SC-DAC circuits 162a through 166a, and it will be understood that the descriptions of the first through third SC-DAC circuits 162a through 166a may also be applied to the fourth through sixth SC-DAC circuits 162b through 166b.

The first through third SC-DAC circuits 162a through 166a may include a plurality of paths, each of which includes an amplifier and a capacitor, to pass a pattern signal. In an example embodiment, when the first pattern signal group PT_Sa includes first through third pattern signals, the first SC-DAC circuit 162a may include a plurality of first paths, each of which includes a first amplifier and a first capacitor, to receive the first pattern signals in parallel, the second SC-DAC circuit 164a may include a plurality of second paths, each of which includes a second amplifier and a second capacitor, to receive the second pattern signals in parallel, and the third SC-DAC circuit 166a may include a plurality of third paths, each of which includes a third amplifier and a third capacitor, to receive the third pattern signals in parallel.

For example, the pattern signal generator 140 may generate a first pattern signal based on a pattern of one I-Q binary data pair and a pattern of one inverted I-Q binary data pair, a second pattern signal having a first phase difference from the first pattern signal, and a third pattern signal having a second phase difference from the first pattern signal. The first SC-DAC circuit 162a may receive the first pattern signal through one of a plurality of first paths, the second SC-DAC circuit 164a may receive the second pattern signal through one of a plurality of second paths, and the third SC-DAC circuit 166a may receive the third pattern signal through one of a plurality of third paths. In an example embodiment, the equivalent capacitance of the second SC-DAC circuit 164a may be "m" times the equivalent capacitance of each of the first and third SC-DAC circuits 162a and 166a, where "m" is a real number of at least 1.

As described above, an inverted-phase component for removing a p-th harmonic component that may produce an intermodulation distortion component may be generated using the first through third SC-DAC circuits 162a through 166a, which respectively receive first through third pattern signals respectively having different phases and each of which has a desired (or alternatively, predetermined) equivalent capacitance.

In an example embodiment, when the second and third SC-DAC circuits 164a and 166a are configured to generate an inverted-phase component for removing a third harmonic component, the phase of a first pattern signal may lead the phase of a second pattern signal by 45 degrees and lead the phase of a third pattern signal by 90 degrees, and the capacitance of the second SC-DAC circuit 164a may be $\sqrt{2}$ times the equivalent capacitance of each of the first and third SC-DAC circuits 162a and 166a. Because it may be difficult to implement the capacitance of the second SC-DAC circuit 164a to be exactly $\sqrt{2}$ times the equivalent capacitance of each of the first and third SC-DAC circuits 162a and 166a in real processes, the capacitance of the second SC-DAC circuit 164a may be 1.4 times the equivalent capacitance of each of the first and third SC-DAC circuits 162a and 166a, wherein 1.4 is approximately $\sqrt{2}$. In some example embodiments, to compensate for difficulty in making the capacitance of the second SC-DAC circuit 164a to be exactly $\sqrt{2}$ times the equivalent capacitance of each of the first and third SC-DAC circuits 162a and 166a in real processes, the voltage regulator 170 may control a supply voltage $V_{DD}$ such that a first supply voltage V1 applied to the second SC-DAC circuit 164a has a higher level than a second supply voltage V2 applied to the first and third SC-DAC circuits 162a and 166a. In some example embodiments, the first through third SC-DAC circuits 162a through 166a may have the same equivalent capacitance, and the first supply voltage V1 and second supply voltage V2 may be regulated to have different levels (e.g., the first supply voltage V1 may be $\sqrt{2}$ times the second supply voltage V2), so that the first through third SC-DAC circuits 162a through 166a generate an inverted-phase component for removing a third harmonic component.

The first SC-DAC circuit 162a may generate a first RF signal from a plurality of first pattern signals, the second SC-DAC circuit 164a may generate a second RF signal from a plurality of second pattern signals, and the third SC-DAC circuit 166a may generate a third RF signal from a plurality of third pattern signals. The first through third RF signals may be summed and provided as an RF analog signal (e.g., an RF output signal) $RF_{OUT}$ to the front-end circuit 180 through a first output terminal 167a.

The fourth SC-DAC circuit 162b may generate a fourth RF signal from a plurality of first inverted pattern signals, the fifth SC-DAC circuit 164b may generate a fifth RF signal from a plurality of second inverted pattern signals, and the sixth SC-DAC circuit 166b may generate a sixth RF signal from a plurality of third inverted pattern signals. The fourth through sixth RF signals may be summed and provided as an inverted RF analog signal (e.g., an inverted RF output signal) $RFB_{OUT}$ to the front-end circuit 180 through a second output terminal 167b.

The front-end circuit 180 may include a balun 182, which is connected to the first and second output terminals 167a and 167b, and a PA 184. The balun 182 may receive and perform a certain conversion operation on the RF analog signal $RF_{OUT}$ and the inverted RF analog signal $RFB_{OUT}$. Through the certain conversion operation of the balun 182, a first intermodulation distortion component, which is produced by a second harmonic component (or an even harmonic component) at the time of non-linear amplification of the RF analog signal $RF_{OUT}$, may be added to a second intermodulation distortion component, which is produced by a second harmonic component (or an even harmonic component) at the time of non-linear amplification of the inverted RF analog signal $RFB_{OUT}$, and thus the first intermodulation distortion component may be removed (e.g., cancelled out).

The PA 184 may amplify an RF analog signal, from which a third harmonic component (or an odd harmonic component) has been removed by the SC-DAC 160 and a second harmonic component (or an even harmonic component) has been removed by the balun 182, thereby generating an RF output signal in which an intermodulation distortion component caused by the harmonic components has been reduced or minimized. The RF output signal of the front-end circuit 180 may be transmitted to a base station or another wireless communication device through the antenna 190.

FIGS. 3A through 3D are graphs for describing the operation of the SC-DAC 160 in FIG. 2, according to an example embodiment. In FIGS. 3A through 3D, the I binary data I and the Q binary data Q is expressed by vectors. It is assumed that the I binary data I having a value of "1" or "0" has a phase of 0 degrees or 180 degrees, and the Q binary data Q having a value of "1" or "0" has a phase of 90 degrees or 270 degrees.

Figure 3A:
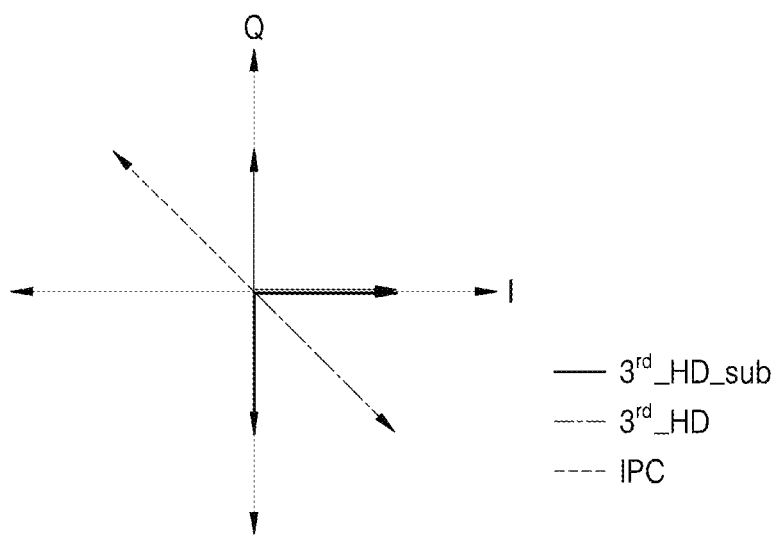
FIGS. 3A through 3D are graphs for describing the operation of a switched-capacitor digital-to-analog converter (SC-DAC) in FIG. 2, according to an example embodiment.

Referring to FIG. 3A, when the SC-DAC 160 receives a pattern signal, which includes the I binary data I corresponding to a phase of 0 degrees and the Q binary data Q corresponding to a phase of 90 degrees, third harmonic sub components $3^{rd}\_HD\_sub$ may be generated during non-linear amplification. A third harmonic sub component $3^{rd}\_HD\_sub$ may have a phase of 0 degrees, which is three times the phase of 0 degrees, and another third harmonic sub component $3^{rd}\_HD\_sub$ may have a phase of 270 degrees, which is three times a phase of 90 degrees, so that a third harmonic component $3^{rd}\_HD$ having a magnitude, which is $\sqrt{2}$ times the magnitude of the third harmonic sub components $3^{rd}\_HD\_sub$, and a phase of 315 degrees may be generated. Accordingly, the SC-DAC 160 needs to generate an inverted-phase component IPC, which has a magnitude $\sqrt{2}$ times the magnitude of the third harmonic sub components $3^{rd}\_HD\_sub$ and a phase of 135 degrees, to remove the third harmonic component $3^{rd}\_HD$. For example, the SC-DAC 160 may generate a signal, which has a magnitude $\sqrt{2}$ times the magnitude of the third harmonic sub components $3^{rd}\_HD\_sub$ and a phase of 45 degrees, and the inverted-phase component IPC having a phase of 135 degrees, which is three times the phase of 45 degrees, may be generated from the signal.

Figure 3B:
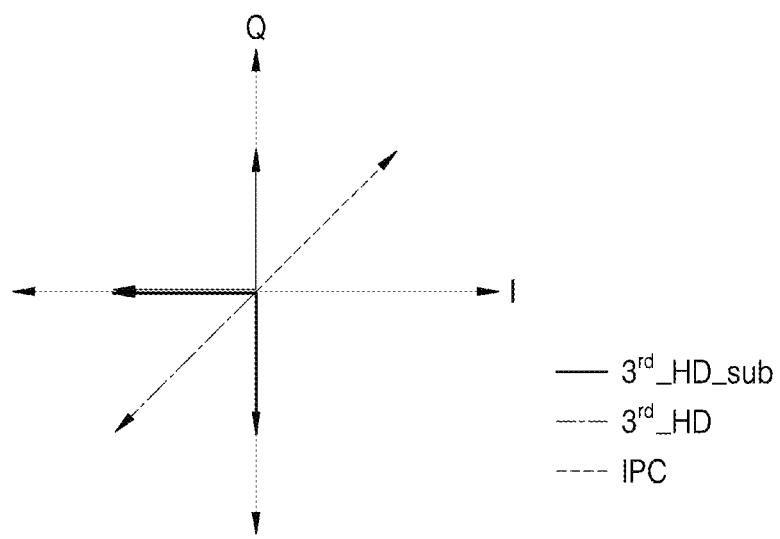

Referring to FIG. 3B, when the SC-DAC 160 receives a pattern signal, which includes the I binary data I corresponding to a phase of 180 degrees and the Q binary data Q corresponding to a phase of 90 degrees, the third harmonic sub components $3^{rd}\_HD\_sub$ may be generated during non-linear amplification. A third harmonic sub component $3^{rd}\_HD\_sub$ may have a phase of 180 degrees, which is three times the phase of 180 degrees, and another third harmonic sub component $3^{rd}\_HD\_sub$ may have a phase of 270 degrees, which is three times a phase of 90 degrees, so that the third harmonic component $3^{rd}\_HD$ having a magnitude, which is $\sqrt{2}$ times the magnitude of the third harmonic sub components $3^{rd}\_HD\_sub$, and a phase of 225 degrees may be generated. Accordingly, the SC-DAC 160 needs to generate the inverted-phase component IPC, which has a magnitude $\sqrt{2}$ times the magnitude of the third harmonic sub components $3^{rd}\_HD\_sub$ and a phase of 45 degrees, to remove the third harmonic component $3^{rd}\_HD$. For example, the SC-DAC 160 may generate a signal, which has a magnitude $\sqrt{2}$ times the magnitude of the third harmonic sub components $3^{rd}\_HD\_sub$ and a phase of 135 degrees, and the inverted-phase component IPC having a phase of 45 degrees, which is three times the phase of 135 degrees, may be generated from the signal.

Figure 3C:
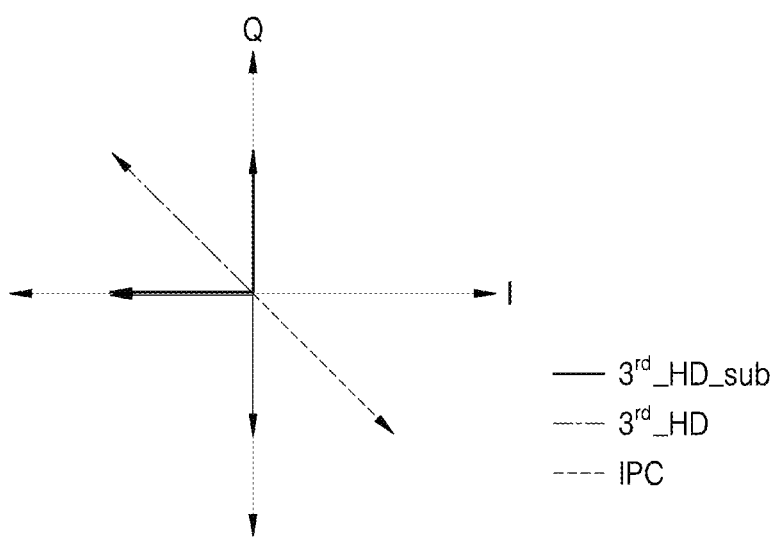

Referring to FIG. 3C, when the SC-DAC 160 receives a pattern signal, which includes the I binary data I corresponding to a phase of 180 degrees and the Q binary data Q corresponding to a phase of 270 degrees, the third harmonic sub components $3^{rd}\_HD\_sub$ may be generated during non-linear amplification. A third harmonic sub component $3^{rd}\_HD\_sub$ may have a phase of 180 degrees, which is three times the phase of 180 degrees, and another third harmonic sub component $3^{rd}\_HD\_sub$ may have a phase of 90 degrees, which is three times a phase of 270 degrees, so that the third harmonic component $3^{rd}\_HD$ having a magnitude, which is $\sqrt{2}$ times the magnitude of the third harmonic sub components $3^{rd}\_HD\_sub$, and a phase of 135 degrees may be generated. Accordingly, the SC-DAC 160 needs to generate the inverted-phase component IPC, which has a magnitude $\sqrt{2}$ times the magnitude of the third harmonic sub components $3^{rd}\_HD\_sub$ and a phase of 315 degrees, to remove the third harmonic component $3^{rd}\_HD$. For example, the SC-DAC 160 may generate a signal, which has a magnitude $\sqrt{2}$ times the magnitude of the third harmonic sub components $3^{rd}\_HD\_sub$ and a phase of 225 degrees, and the inverted-phase component IPC having a phase of 315 degrees, which is three times the phase of 225 degrees, may be generated from the signal.

Figure 3D:
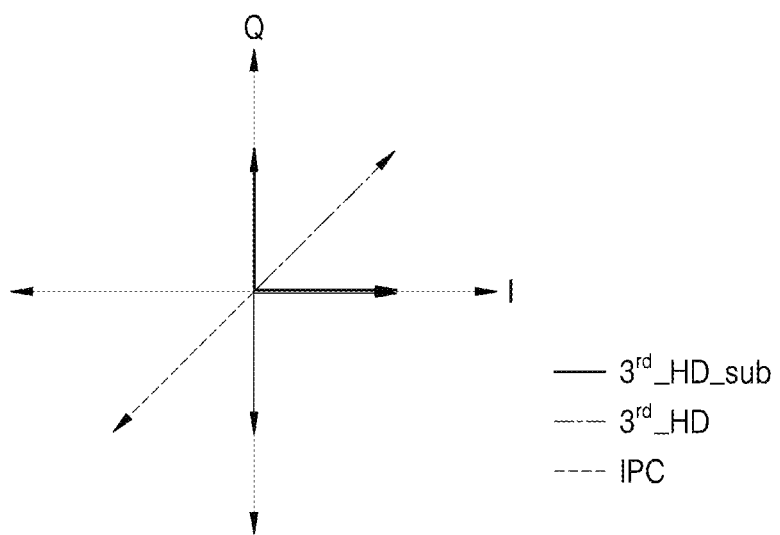

Referring to FIG. 3D, when the SC-DAC 160 receives a pattern signal, which includes the I binary data I corresponding to a phase of 0 degrees and the Q binary data Q corresponding to a phase of 270 degrees, the third harmonic sub components $3^{rd}\_HD\_sub$ may be generated during non-linear amplification. A third harmonic sub component $3^{rd}\_HD\_sub$ may have a phase of 0 degrees, which is three times the phase of 0 degrees, and another third harmonic sub component $3^{rd}\_HD\_sub$ may have a phase of 90 degrees, which is three times a phase of 270 degrees, so that the third harmonic component $3^{rd}\_HD$ having a magnitude, which is $\sqrt{2}$ times the magnitude of the third harmonic sub components $3^{rd}\_HD\_sub$, and a phase of 45 degrees may be generated. Accordingly, the SC-DAC 160 needs to generate the inverted-phase component IPC, which has a magnitude $\sqrt{2}$ times the magnitude of the third harmonic sub components $3^{rd}\_HD\_sub$ and a phase of 225 degrees, to remove the third harmonic component $3^{rd}\_HD$. For example, the SC-DAC 160 may generate a signal, which has a magnitude $\sqrt{2}$ times the magnitude of the third harmonic sub components $3^{rd}\_HD\_sub$ and a phase of 315 degrees, and the inverted-phase component IPC having a phase of 225 degrees, which is three times the phase of 315 degrees, may be generated from the signal.

Figure 4:
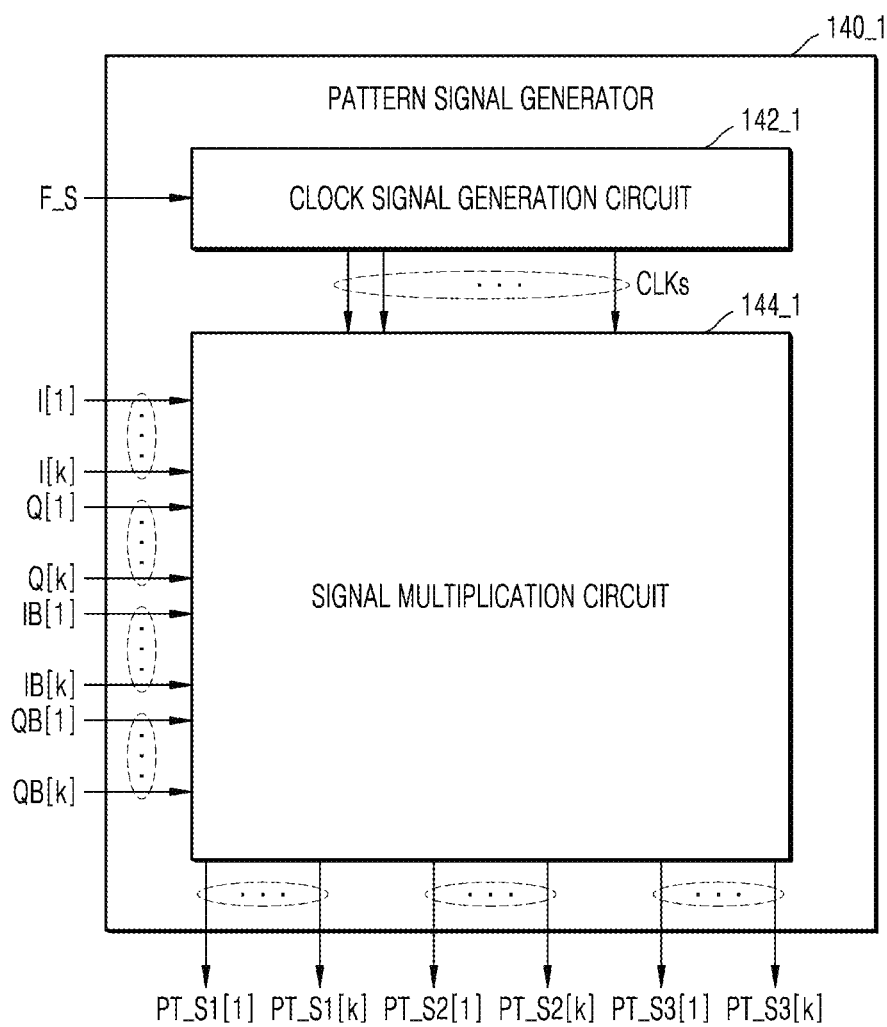
FIG. 4 is a block diagram of a pattern signal generator according to an example embodiment.
Figure 5A:
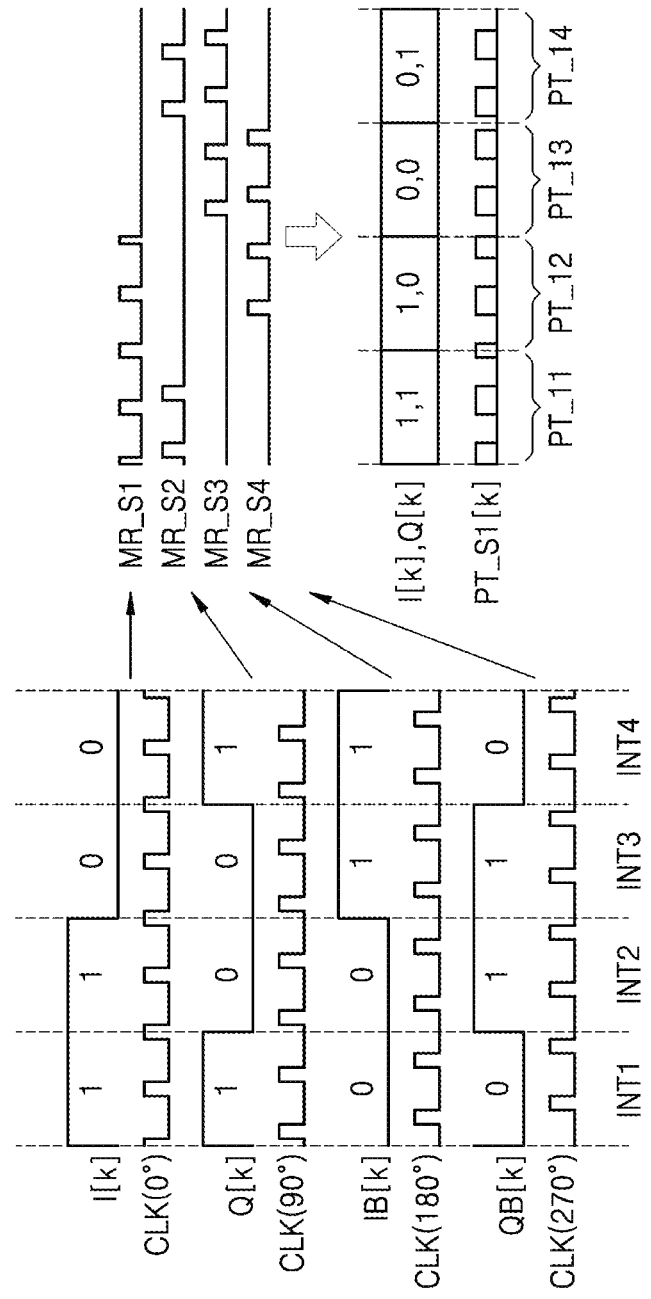
FIGS. 5A through 5C are timing diagrams for describing operations of the pattern signal generator of FIG. 4.
Figure 5B:
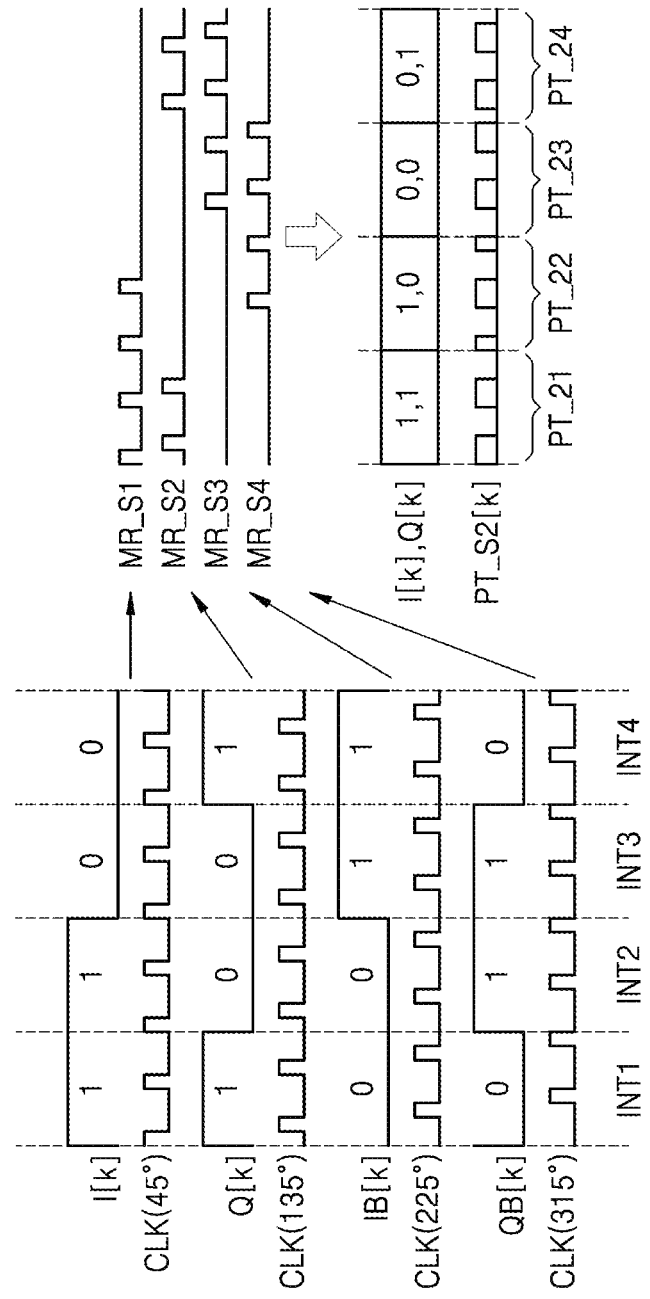
Figure 5C:
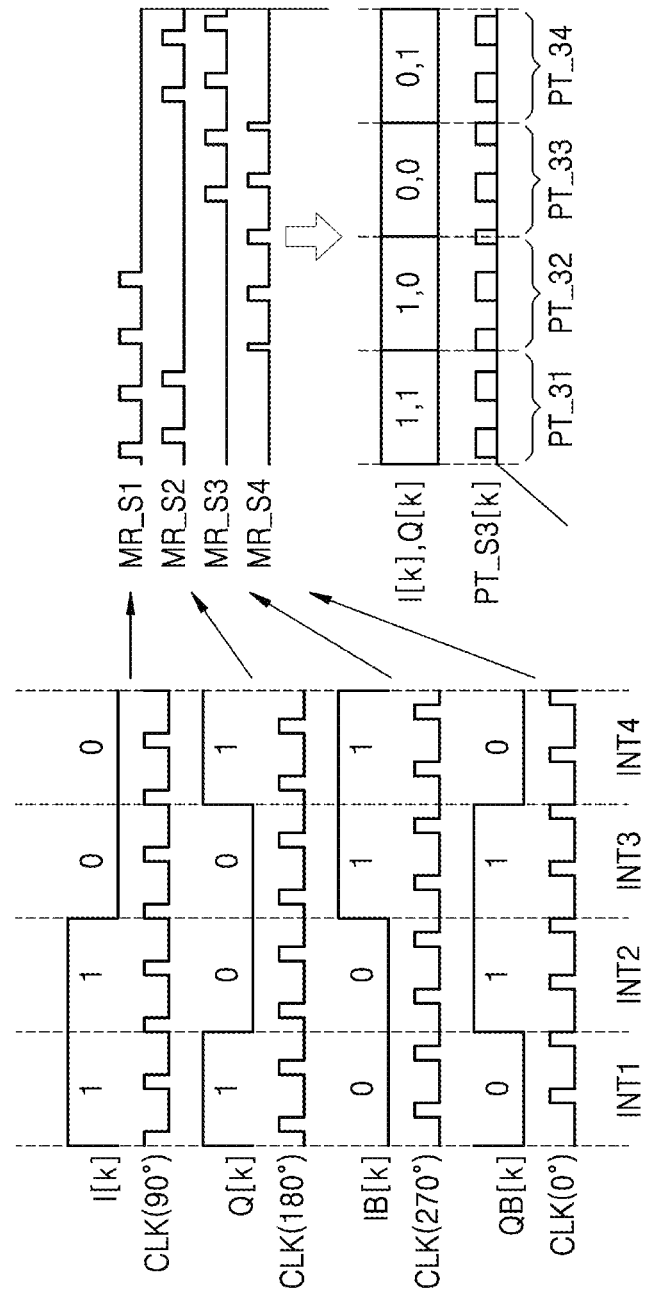

FIG. 4 is a block diagram of a pattern signal generator 140_1 according to an example embodiment. FIGS. 5A through 5C are timing diagrams for describing operations of the pattern signal generator 140_1 of FIG. 4.

Referring to FIG. 4, the pattern signal generator 140_1 may include a clock signal generation circuit 142_1 and a signal multiplication circuit 144_1. The clock signal generation circuit 142_1 may generate a plurality of clock signals CLKs, which have a target frequency, a target duty ratio, and different phases from each other, by dividing the frequency signal F_S having a certain frequency. In an example embodiment, the clock signal generation circuit 142_1 may generate the clock signals CLKs, which have phases of 0, 45, 90, 135, 180, 225, 270, and 315 degrees, respectively, and a duty ratio of 1/4, as shown in FIGS. 5A through 5C. The target frequency of the clock signals CLKs may be adjusted according to an RF band, and the clock signals CLKs may be used to up-convert a frequency of a baseband digital signal into an RF band analog signal.

The signal multiplication circuit 144_1 may receive I binary data I[1] through I[k], Q binary data Q[1] through Q[k], inverted I binary data IB[1] through IB[k], and inverted Q binary data Q[1] through Q[k] bit by bit in parallel. The signal multiplication circuit 144_1 may multiply the clock signals CLKs by the I binary data I[1] through I[k], the Q binary data Q[1] through Q[k], the inverted I binary data IB[1] through IB[k], and the inverted Q binary data Q[1] through Q[k], thereby generating a plurality of first pattern signals PT_S1[1] through PT_S1[k], a plurality of second pattern signals PT_S2[1] through PT_S2[k], and a plurality of third pattern signals PT_S3[1] through PT_S3[k] by bits. As described above, the first pattern signals PT_S1[1] through PT_S1[k] may be input to the first SC-DAC circuit 162a in FIG. 2, the second pattern signals PT_S2[1] through PT_S2[k] may be input to the second SC-DAC circuit 164a in FIG. 2, and the third pattern signals PT_S3[1] through PT_S3[k] may be input to the third SC-DAC circuit 166a in FIG. 2.

Referring further to FIG. 5A, the signal multiplication circuit 144_1 may multiply a clock signal CLK(0°) having a phase of 0 degrees by the I binary data I[k], multiply a clock signal CLK(90°) having a phase of 90 degrees by the Q binary data Q[k], multiply a clock signal CLK(180°) having a phase of 180 degrees by the inverted I binary data IB[k], and multiply a clock signal CLK(270°) having a phase of 270 degrees by the inverted Q binary data QB[k], thereby generating multiplication result signals MR_S1 through MR_S4. The signal multiplication circuit 144_1 may generate the first pattern signal PT_S1[k] by summing the multiplication result signals MR_S1 through MR_S4.

When the signal multiplication circuit 144_1 receives the I binary data I[k], the Q binary data Q[k], the inverted I binary data IB[k], and the inverted Q binary data QB[k], which have values "1", "1", "0", and "0", respectively, in a first interval INT1, the signal multiplication circuit 144_1 may generate the first pattern signal PT_S1[k] having a first pattern PT_11. When the signal multiplication circuit 144_1 receives the I binary data I[k], the Q binary data Q[k], the inverted I binary data IB[k], and the inverted Q binary data QB[k], which have values "1", "0", "0", and "1", respectively, in a second interval INT2, the signal multiplication circuit 144_1 may generate the first pattern signal PT_S1[k] having a second pattern PT_12. When the signal multiplication circuit 144_1 receives the I binary data I[k], the Q binary data Q[k], the inverted I binary data IB[k], and the inverted Q binary data QB[k], which have values "0", "0", "1", and "1", respectively, in a third interval INT3, the signal multiplication circuit 144_1 may generate the first pattern signal PT_S1[k] having a third pattern PT_13. When the signal multiplication circuit 144_1 receives the I binary data I[k], the Q binary data Q[k], the inverted I binary data IB[k], and the inverted Q binary data QB[k], which have values "0", "1", "1", and "0", respectively, in a fourth interval INT4, the signal multiplication circuit 144_1 may generate the first pattern signal PT_S1[k] having a fourth pattern PT_14.

Referring further to FIG. 5B, the signal multiplication circuit 144_1 may multiply a clock signal CLK(45°) having a phase of 45 degrees by the I binary data I[k], multiply a clock signal CLK(135°) having a phase of 135 degrees by the Q binary data Q[k], multiply a clock signal CLK(225°) having a phase of 225 degrees by the inverted I binary data IB[k], and multiply a clock signal CLK(315°) having a phase of 315 degrees by the inverted Q binary data QB[k], thereby generating the multiplication result signals MR_S1 through MR_S4. The signal multiplication circuit 144_1 may generate the second pattern signal PT_S2[k] by summing the multiplication result signals MR_S1 through MR_S4.

When the signal multiplication circuit 144_1 receives the I binary data I[k], the Q binary data Q[k], the inverted I binary data IB[k], and the inverted Q binary data QB[k], which have values "1", "1", "0", and "0", respectively, in the first interval INT1, the signal multiplication circuit 144_1 may generate the second pattern signal PT_S2[k] having a first pattern PT_21. When the signal multiplication circuit 144_1 receives the I binary data I[k], the Q binary data Q[k], the inverted I binary data IB[k], and the inverted Q binary data QB[k], which have values "1", "0", "0", and "1", respectively, in the second interval INT2, the signal multiplication circuit 144_1 may generate the second pattern signal PT_S2[k] having a second pattern PT_22. When the signal multiplication circuit 144_1 receives the I binary data I[k], the Q binary data Q[k], the inverted I binary data IB[k], and the inverted Q binary data QB[k], which have values "0", "0", "1", and "1", respectively, in the third interval INT3, the signal multiplication circuit 144_1 may generate the second pattern signal PT_S2[k] having a third pattern PT_23. When the signal multiplication circuit 144_1 receives the I binary data I[k], the Q binary data Q[k], the inverted I binary data IB[k], and the inverted Q binary data QB[k], which have values "0", "1", "1", and "0", respectively, in the fourth interval INT4, the signal multiplication circuit 144_1 may generate the second pattern signal PT_S2[k] having a fourth pattern PT_24.

Referring further to FIG. 5C, the signal multiplication circuit 144_1 may multiply the clock signal CLK(90°) having a phase of 90 degrees by the I binary data I[k], multiply the clock signal CLK(180°) having a phase of 180 degrees by the Q binary data Q[k], multiply the clock signal CLK(270°) having a phase of 270 degrees by the inverted I binary data IB [k], and multiply the clock signal CLK(0°) having a phase of 0 degrees by the inverted Q binary data QB[k], thereby generating the multiplication result signals MR_S1 through MR_S4. The signal multiplication circuit 144_1 may generate the third pattern signal PT_S3[k] by summing the multiplication result signals MR_S1 through MR_S4.

When the signal multiplication circuit 144_1 receives the I binary data I[k], the Q binary data Q[k], the inverted I binary data IB[k], and the inverted Q binary data QB[k], which have values "1", "1", "0", and "0", respectively, in the first interval INT1, the signal multiplication circuit 144_1 may generate the third pattern signal PT_S3[k] having a first pattern PT_31. When the signal multiplication circuit 144_1 receives the I binary data I[k], the Q binary data Q[k], the inverted I binary data IB[k], and the inverted Q binary data QB[k], which have values "1", "0", "0", and "1", respectively, in the second interval INT2, the signal multiplication circuit 144_1 may generate the third pattern signal PT_S3[k] having a second pattern PT_32. When the signal multiplication circuit 144_1 receives the I binary data I[k], the Q binary data Q[k], the inverted I binary data IB[k], and the inverted Q binary data QB[k], which have values "0", "0", "1", and "1", respectively, in the third interval INT3, the signal multiplication circuit 144_1 may generate the third pattern signal PT_S3[k] having a third pattern PT_33. When the signal multiplication circuit 144_1 receives the I binary data I[k], the Q binary data Q[k], the inverted I binary data IB[k], and the inverted Q binary data QB[k], which have values "0", "1", "1", and "0", respectively, in the fourth interval INT4, the signal multiplication circuit 144_1 may generate the third pattern signal PT_S3[k] having a fourth pattern PT_34.

Thus, the signal multiplication circuit 144_1 may generate the first pattern signal PT_S1[k], the second pattern signal PT_S2[k], a phase of which lags the phase of the first pattern signal PT_S1[k] by 45 degrees, and the third pattern signal PT_S3[k], a phase of which lags the phase of the first pattern signal PT_S1[k] by 90 degrees.

According to the example embodiment, the inverted I binary data IB [k] and the inverted Q binary data QB[k] (or an inverted I-Q binary data pair) is used in addition to the I binary data I[k] and the Q binary data Q[k] (or an I-Q binary data pair) when the signal multiplication circuit 144_1 generates a pattern signal to enable, even when the I binary data I[k] or the Q binary data Q[k] has a value "0", the orientation thereof to be represented by a phase. Thus, according to an example embodiment, a digital RF transmitter may generate an inverted-phase component having an opposite phase to a third harmonic component (or an odd harmonic component).

Figure 6:
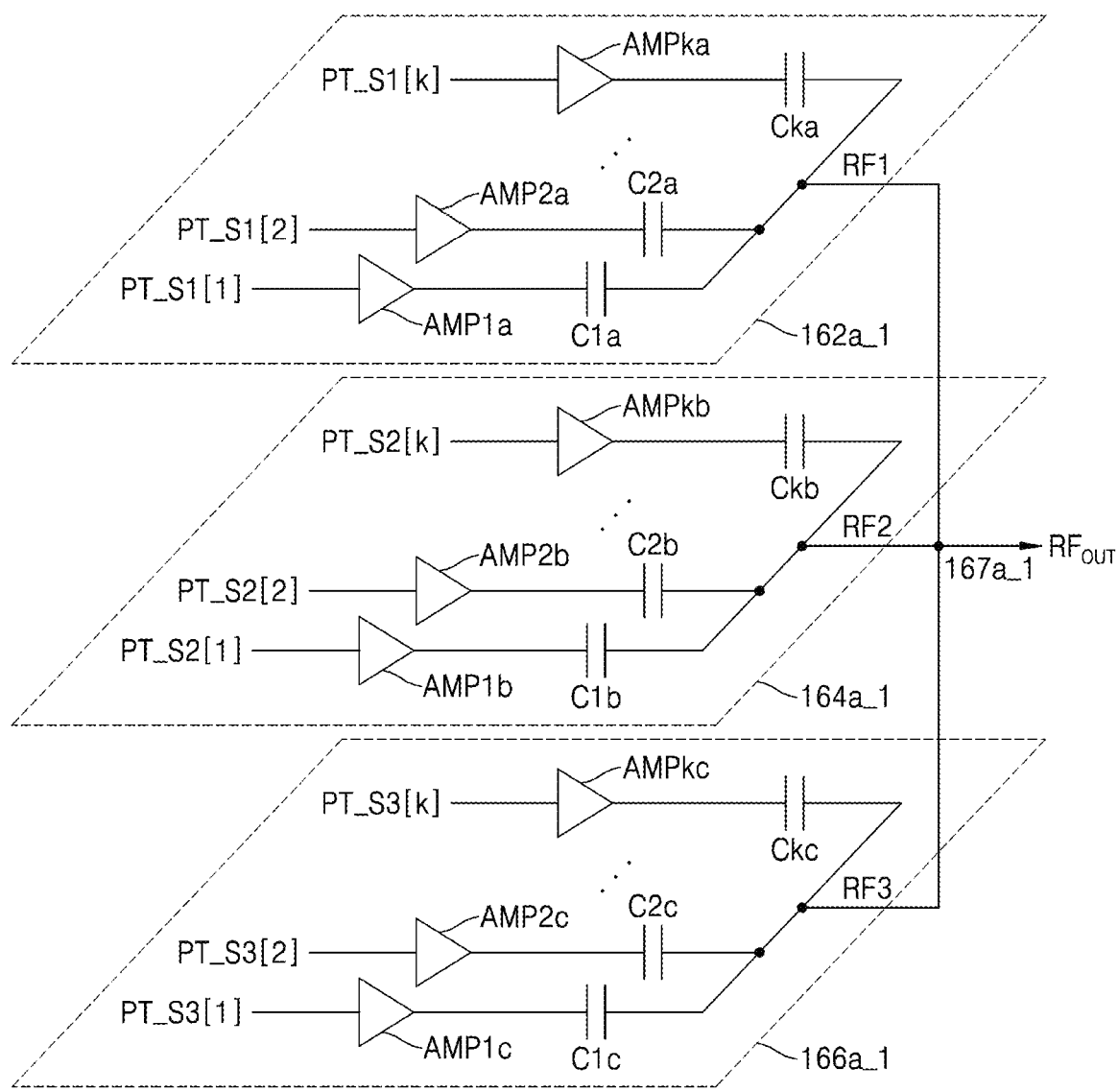
FIG. 6 is a circuit diagram of first through third SC-DAC circuits according to an example embodiment.

FIG. 6 is a circuit diagram of first through third SC-DAC circuits 162a_1, 164a_1, and 166a_1 according to an example embodiment.

The first SC-DAC circuit 162a_1 may include a plurality of first amplifiers AMP1a through AMPka and a plurality of first capacitors C1a through Cka. Each of the first amplifiers AMP1a through AMPka and each of the first capacitors C1a through Cka may form a path, through which a corresponding one of the first pattern signals PT_S1[1] through PT_S1[k] passes. In other words, the first SC-DAC circuit 162a_1 may include a plurality of paths, through which the first pattern signals PT_S1[1] through PT_S1[k] pass, respectively, and may output a first RF signal RF1 from the first pattern signals PT_S1[1] through PT_S1[k].

The second SC-DAC circuit 164a_1 may include a plurality of second amplifiers AMP1b through AMPkb and a plurality of second capacitors C1b through Ckb. Each of the second amplifiers AMP1b through AMPkb and each of the second capacitors C1b through Ckb may form a path, through which a corresponding one of the second pattern signals PT_S2[1] through PT_S2[k] passes. In other words, the second SC-DAC circuit 164a_1 may include a plurality of paths, through which the second pattern signals PT_S2[1] through PT_S2[k] pass, respectively, and may output a second RF signal RF2 from the second pattern signals PT_S2[1] through PT_S2[k].

The third SC-DAC circuit 166a_1 may include a plurality of third amplifiers AMP1c through AMPkc and a plurality of third capacitors C1c through Ckc. Each of the third amplifiers AMP1c through AMPkc and each of the third capacitors C1c through Ckc may form a path, through which a corresponding one of the third pattern signals PT_S3[1] through PT_S3[k] passes. In other words, the third SC-DAC circuit 166a_1 may include a plurality of paths, through which the third pattern signals PT_S3[1] through PT_S3[k] pass, respectively, and may output a third RF signal RF3 from the third pattern signals PT_S3[1] through PT_S3[k]. The first through third RF signals RF1 through RF3 may be summed and output as the RF analog signal $RF_{OUT}$ through a first output terminal 167a_1.

In an example embodiment, the capacitance of the second capacitors C1b through Ckb may be "m" times the capacitance of the first and third capacitors C1a through Cka and C1c through Ckc, where "m" is a real number of at least 1. For example, when "m" is $\sqrt{2}$, the capacitance of the capacitor Ckb of the second SC-DAC circuit 164a_1 may be $\sqrt{2}$ times the capacitance of the capacitor Cka of the first SC-DAC circuit 162a_1 and the capacitor Ckc of the third SC-DAC circuit 166a_1. In other words, the equivalent capacitance of the second SC-DAC circuit 164a_1 may be $\sqrt{2}$ times the equivalent capacitance of each of the first and third SC-DAC circuits 162a_1 and 166a_1. The reason why the first through third SC-DAC circuits 162a_1, 164a_1, and 166a_1 have such capacitor configuration will be described in detail with reference to FIG. 8 below.

In FIG. 6, each of the first through third capacitors C1a through Cka, C1b through Ckb, and C1c through Ckc may include a plurality of unit capacitors. A unit capacitor may be an element that has a certain capacitance. In an example embodiment, the number of unit capacitors forming the capacitor Ckb of the second SC-DAC circuit 164a_1 may be greater than the number of unit capacitors forming each of the capacitor Cka of the first SC-DAC circuit 162a_1 and the capacitor Ckc of the third SC-DAC circuit 166a_1. For example, the number of unit capacitors forming the capacitor Ckb of the second SC-DAC circuit 164a_1 may be seven, and the number of unit capacitors forming each of the capacitor Cka of the first SC-DAC circuit 162a_1 and the capacitor Ckc of the third SC-DAC circuit 166a_1 may be five. Through this configuration, the capacitance of the second capacitors C1b through Ckb may be $\sqrt{2}$ times the capacitance of the first and third capacitors C1a through Cka and C1c through Ckc.

The phase of the first pattern signals PT_S1[1] through PT_S1[k] input to the first SC-DAC circuit 162a_1 may lead the phase of the second pattern signals PT_S2[1] through PT_S2[k] input to the second SC-DAC circuit 164a_1 by 45 degrees and the phase of the third pattern signals PT_S3[1] through PT_S3[k] input to the third SC-DAC circuit 166a_1 by 90 degrees.

The first through third SC-DAC circuits 162a_1, 164a_1, and 166a_1 illustrated in FIG. 6 are just examples and may be variously embodied so as to convert a digital signal into an analog signal, without being limited to the examples.

Figure 7:
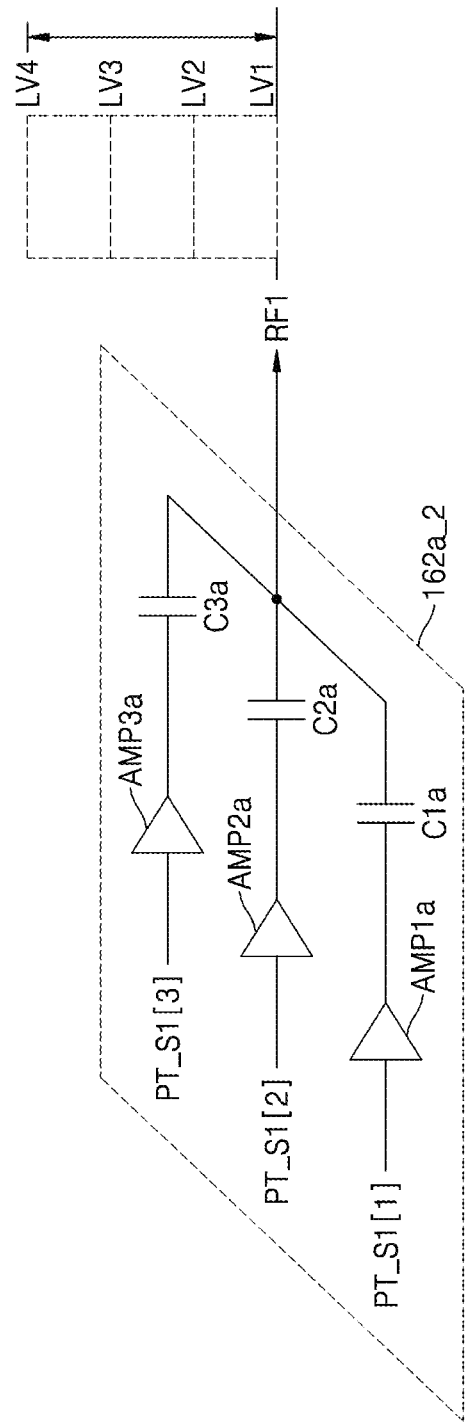
FIG. 7 is a diagram for describing a method of determining the magnitude of a first radio frequency (RF) signal in a first SC-DAC circuit, according to an example embodiment.

FIG. 7 is a diagram for describing a method of determining the magnitude of the first RF signal RF1 in a first SC-DAC circuit 162a_2, according to an example embodiment. The descriptions below may also applied to other SC-DAC circuits. The first SC-DAC circuit 162a_2 of FIG. 7 is just an example and may be variously embodied, without being limited to the example.

Referring to FIG. 7, the first SC-DAC circuit 162a_2 may include a plurality of amplifiers AMP1a through AMP3a and a plurality of capacitors C1a through C3a. Each of first pattern signals PT_S1[1] through PT_S1[3] may pass through a path, which includes one of the amplifiers AMP1a through AMP3a and one of the capacitors C1a through C3a. The level of the first RF signal RF1 may be determined to be one of first through fourth levels LV1 through LV4 according to the pattern of each of the first pattern signals PT_S1[1] through PT_S1[3]. In other words, different patterns of the first pattern signals PT_S1[1] through PT_S1[3] may be represented by different magnitudes of the first RF signal RF1, respectively, through the first SC-DAC circuit 162a_2. In this manner, a digital signal may be converted into an analog signal. As described above with reference to FIG. 6, each of the capacitors C1a through C3a may include a plurality of unit capacitors.

Figure 8:
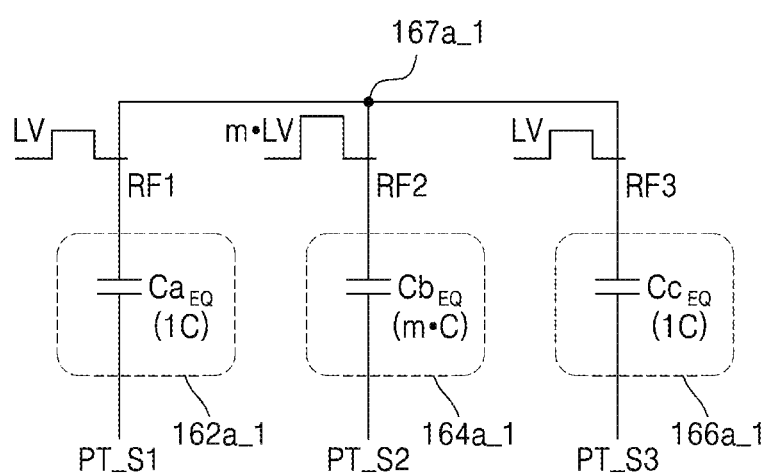
FIG. 8 is a diagram for describing equivalent capacitors of the first through third SC-DAC circuits in FIG. 6.

FIG. 8 is a diagram for describing equivalent capacitors $Ca_{EQ}$, $Cb_{EQ}$, and $Cc_{EQ}$ of the first through third SC-DAC circuits 162a_1, 164a_1, and 166a_1 in FIG. 6.

Referring to FIG. 8, the output of each of the first through third SC-DAC circuits 162a_1, 164a_1, and 166a_1 may be connected to the first output terminal 167a_1, and a capacitance ratio among the equivalent capacitors $Ca_{EQ}$, $Cb_{EQ}$, and $Cc_{EQ}$ of the first through third SC-DAC circuits 162a_1, 164a_1, and 166a_1 may be 1:m:1. Accordingly, a magnitude ratio among the first through third RF signals RF1 through RF3 respectively corresponding to first through third pattern signals PT_S1, PT_S2, and PT_S3 having the same pattern may be 1:m:1. As described above, each of the equivalent capacitors $Ca_{EQ}$, $Cb_{EQ}$, and $Cc_{EQ}$ may include a plurality of unit capacitors.

The second RF signal RF2 output from the second SC-DAC circuit 164a_2 may include a frequency component corresponding to an inverted-phase component for removing a third harmonic component (or an odd harmonic component). The magnitude of the second RF signal RF2 may be "m" times the magnitude of each of the first and third RF signals RF1 and RF3. In an example embodiment, "m" may be $\sqrt{2}$ or a real number that approximates √2.

Figure 9:
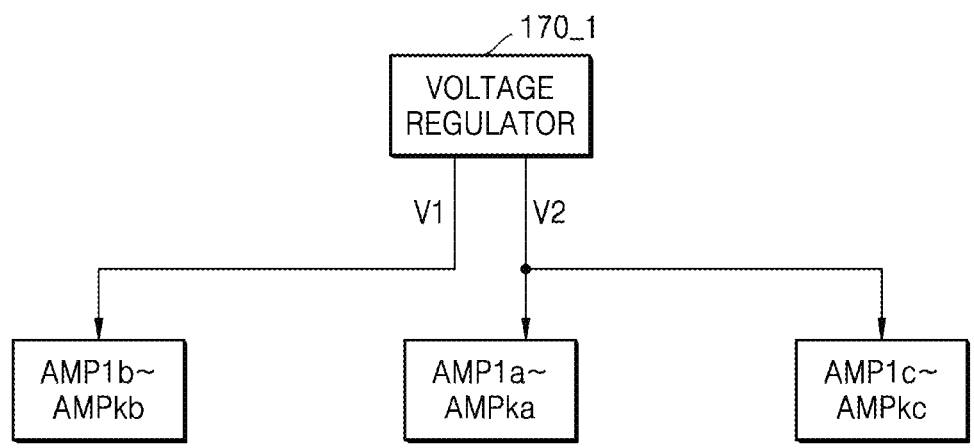
FIG. 9 is a diagram for describing a supply voltage applied to amplifiers of each of the first through third SC-DAC circuits in FIG. 6.

FIG. 9 is a diagram for describing a supply voltage applied to each of the first through third amplifiers AMP1a through AMPka, AMP1b through AMPkb, and AMP1c through AMPkc of the first through third SC-DAC circuits 162a_1, 164a_1, and 166a_1 in FIG. 6.

Referring to FIG. 9, a voltage regulator 170_1 may generate the first supply voltage V1 and the second supply voltage V2 from a certain supply voltage such that the second supply voltage V2 has a different level from the first supply voltage V1. For example, the first supply voltage V1 may be greater than the second supply voltage V2, and the voltage regulator 170_1 may apply the first supply voltage V1 to the second amplifiers AMP1b through AMPkb and the second supply voltage V2 to the first amplifiers AMP1a through AMPka and the third amplifiers AMP1c through AMPkc. Accordingly, the second amplifiers AMP1b through AMPkb may amplify a received signal to a greater extent than the first and third amplifiers AMP1a through AMPka and AMP1c through AMPkc.

As described above, it is difficult to implement the capacitance ratio among the equivalent capacitors $Ca_{EQ}$, $Cb_{EQ}$, and $Cc_{EQ}$ of the first through third SC-DAC circuits 162a_1, 164a_1, and 166a_1 to be 1:$\sqrt{2}$:1 in real processes, as illustrated in the example embodiment of FIG. 8. Such issues in the real processes may be solved through the example embodiment of FIG. 9, which generates an inverted-phase component having the same magnitude as a third harmonic component.

Figure 10:
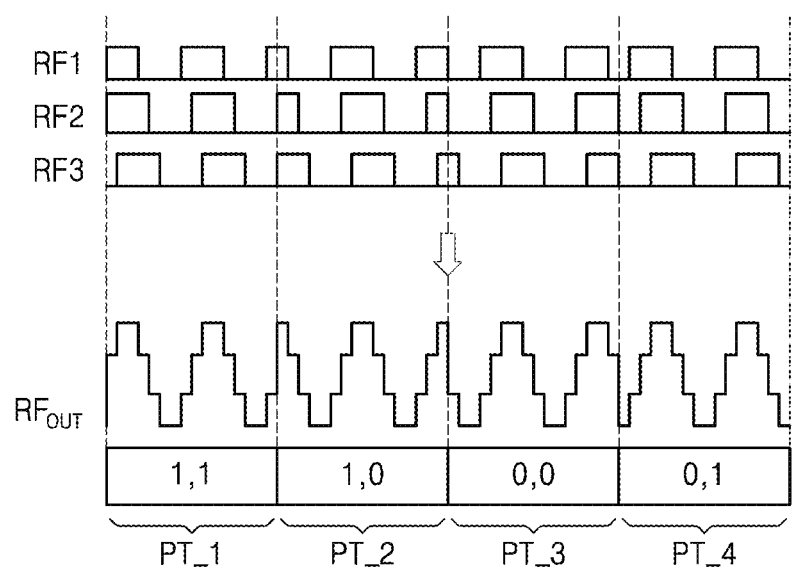
FIG. 10 is a diagram for describing patterns of an RF analog signal generated by summing first through third RF signals in FIG. 6.

FIG. 10 is a diagram for describing first through fourth patterns PT_1 through PT_4 of the RF analog signal $RF_{OUT}$ generated by summing the first through third RF signals RF1 through RF3 in FIG. 6. For clear understanding, the case where one first pattern signal, e.g., the first pattern signal PT_S1[k], among k-bit pattern signals and the second and third pattern signals PT_S2[k] and PT_S3[k] corresponding to the first pattern signal PT_S1[k] are input to the first through third SC-DAC circuits 162a_1, 164a_1, and 166a_1, respectively, will be described with reference to FIG. 10.

Referring to FIGS. 6 and 10, when the pattern of an I-Q binary data pair is "1,1", the first through third SC-DAC circuits 162a_1, 164a_1, and 166a_1 may output the first through third RF signals RF1 through RF3, respectively, and the RF analog signal $RF_{OUT}$ having the first pattern PT_1 may be output through the first output terminal 167a_1. When the pattern of an I-Q binary data pair is "1,0", the first through third SC-DAC circuits 162a_1, 164a_1, and 166a_1 may output the first through third RF signals RF1 through RF3, respectively, and the RF analog signal $RF_{OUT}$ having the second pattern PT_2 may be output through the first output terminal 167a_1. When the pattern of an I-Q binary data pair is "0,0", the first through third SC-DAC circuits 162a_1, 164a_1, and 166a_1 may output the first through third RF signals RF1 through RF3, respectively, and the RF analog signal $RF_{OUT}$ having the third pattern PT_3 may be output through the first output terminal 167a_1. When the pattern of an I-Q binary data pair is "0,1", the first through third SC-DAC circuits 162a_1, 164a_1, and 166a_1 may output the first through third RF signals RF1 through RF3, respectively, and the RF analog signal $RF_{OUT}$ having the fourth pattern PT_4 may be output through the first output terminal 167a_1.

In an example embodiment, the phase of the first RF signal RF1 may lead the phase of the second RF signal RF2 by 45 degrees and lead the phase of the third RF signal RF3 by 90 degrees. The magnitude of the second RF signal RF2 may be $\sqrt{2}$ times the magnitude of each of the first RF signal RF1 and the third RF signal RF3.

As shown in FIG. 10, the first through fourth patterns PT_1 through PT_4 of the RF analog signal $RF_{OUT}$ may be determined in advance according to I-Q binary data pairs, and accordingly, the RF analog signal $RF_{OUT}$ corresponding to each I-Q binary data pair may be generated by generating in advance a plurality of clock signals having different duty ratios and combining the clock signals according to the I-Q binary data pair. This will be described with reference to FIG. 11.

Figure 11:
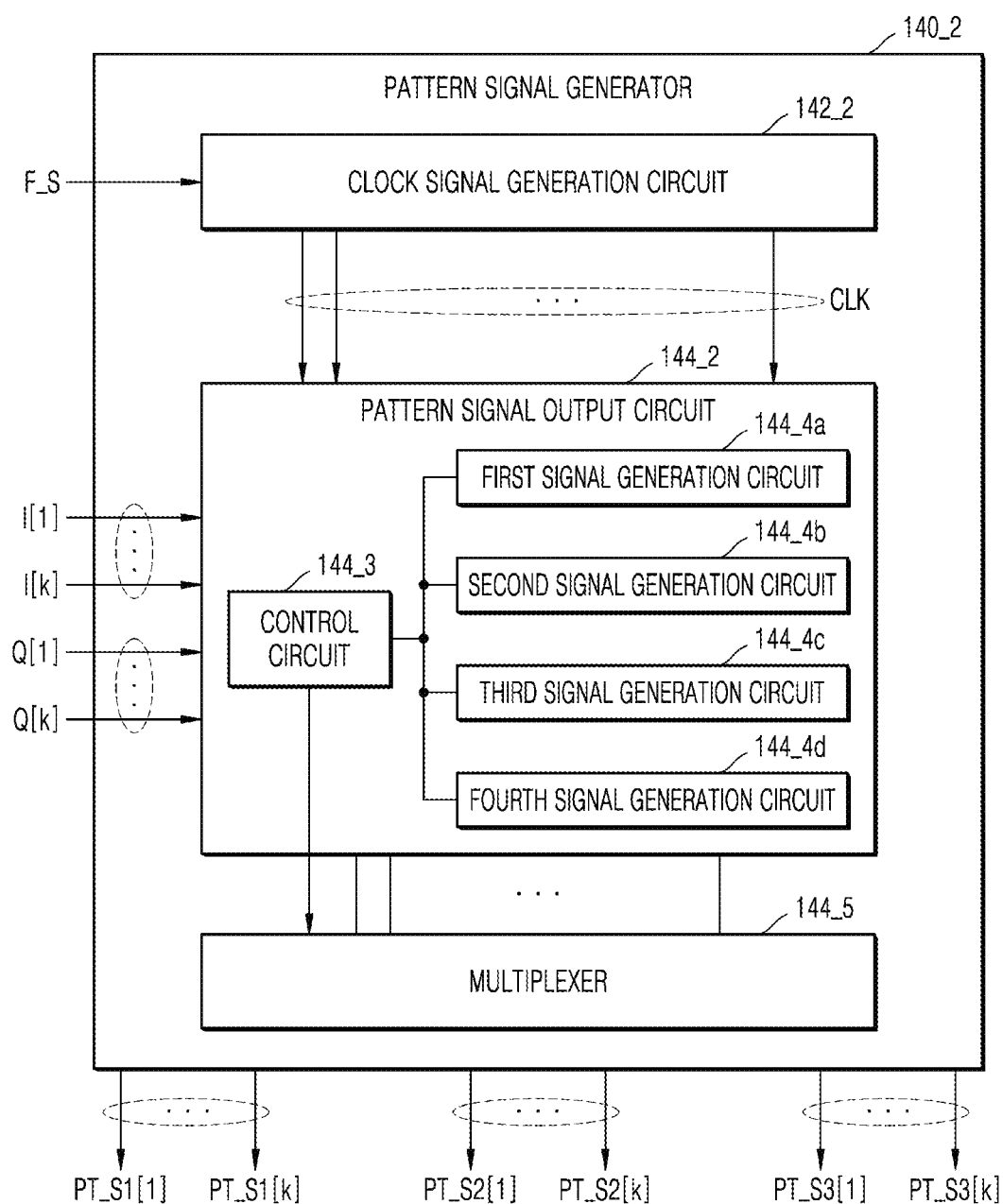
FIG. 11 is a block diagram of a pattern signal generator according to an example embodiment.

FIG. 11 is a block diagram of a pattern signal generator 140_2 according to an example embodiment.

Referring to FIGS. 10 and 11, the pattern signal generator 140_2 may include a clock signal generation circuit 142_2, a pattern signal output circuit 144_2, and a multiplexer 144_5. The clock signal generation circuit 142_2 may generate the clock signals CLKs, which have a target frequency (or a carrier frequency), a target duty ratio, and different phases from each other, by dividing the frequency signal F_S having a certain frequency. The pattern signal output circuit 144_2 may be configured to generate first through third pattern signals by using at least one of the clock signals CLKs.

The pattern signal output circuit 144_2 may include a control circuit 144_3 and first through fourth signal generation circuits 144_4a through 144_4d. Each of the first through fourth signal generation circuits 144_4a through 144_4d may output signals forming one of the first through fourth patterns PT_1 through PT_4 in FIG. 10. For example, the first signal generation circuit 144_4a may generate component signals forming the first pattern PT_1, the second signal generation circuit 144_4b may generate component signals forming the second pattern PT_2, the third signal generation circuit 144_4c may generate component signals forming the third pattern PT_3, and the fourth signal generation circuit 144_4d may generate component signals forming the fourth pattern PT_4.

The control circuit 144_3 may receive the I binary data I[1] through I[k] and the Q binary data Q[1] through Q[k] bit by bit in parallel, and may control the first through fourth signal generation circuits 144_4a through 144_4d and the multiplexer 144_5 such that component signals, which form a pattern corresponding to an I-Q binary data pair among the first through fourth patterns PT_1 through PT_4, are output as the first pattern signals PT_S1[1] through PT_S1[k], the second pattern signals PT_S2[1] through PT_S2[k], and the third pattern signals PT_S3[1] through PT_S3[k]. For example, the control circuit 144_3 may control activation of the first through fourth signal generation circuits 144_4a through 144_4d, and may control the multiplexer 144_5 such that each of component signals generated from each of the first through fourth signal generation circuits 144_4a through 144_4d is output to an SC-DAC circuit allocated for each component signal. In some example embodiments, all of the first through fourth signal generation circuits 144_4a through 144_4d may be activated to generate component signals in advance, and the control circuit 144_3 may control the multiplexer 144_5 to output each of the component signals to an SC-DAC circuit allocated therefor.

For example, when the I binary data I[k] and the Q binary data Q[k], which correspond to a bit index "k", is "1,1", the first signal generation circuit 144_4a may output a first component signal having a first duty ratio as the first pattern signal PT_S1[k], a second component signal having a second duty ratio as the second pattern signal PT_S2[k], and a third component signal having a third duty ratio as the third pattern signal PT_S3[k]. In an example embodiment, the first duty ratio may be 1/4, the second duty ratio may be 1/2, and the third duty ratio may be 3/4.

In another example, components signals may have different phases. Accordingly, when a set of the I binary data I[k] and the Q binary data Q[k], which corresponds to the bit index "k", is "1,1", the first through third component signals for generating the first pattern PT_1 may be generated by the first signal generation circuit 144_4a. When the I binary data I[k_1] and the Q binary data Q[k_1], which correspond to a bit index k-1, is "1,0", fourth through sixth component signals for generating the second pattern PT_2 may be generated by the second signal generation circuit 144_4b. When the I binary data I[k_2] and the Q binary data Q[k_2], which correspond to bit index k_2, is "0,0", seventh through ninth component signals for generating the third pattern PT_3 may be generated by the third signal generation circuit 144_4c. When the I binary data I[k_3] and the Q binary data Q[k_3], which correspond to a bit index k_3, is "0,1", tenth through twelfth component signals for generating the fourth pattern PT_4 may be generated by the fourth signal generation circuit 144_4d.

As described above, through the configuration of the pattern signal generator 140_2 that outputs component signals, which have been determined in advance according to the patterns of I-Q binary data pairs, to an SC-DAC so that the RF analog signal $RF_{OUT}$ in FIG. 10 is output, communication performance may be increased and a structure may be simplified.

Figure 12A:
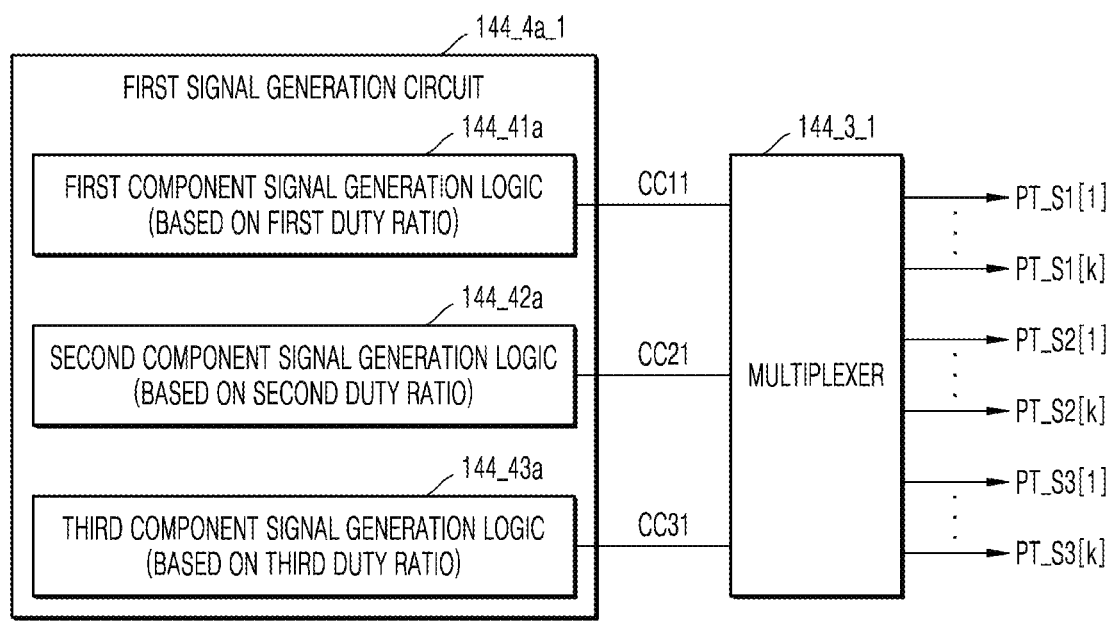
FIG. 12A is a block diagram of a first signal generation circuit in FIG. 11.
Figure 12B:
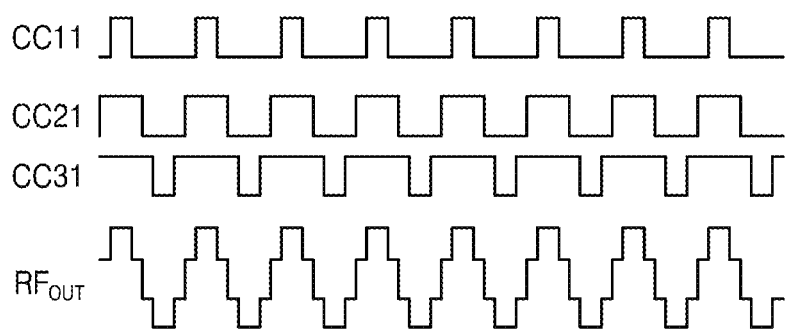
FIG. 12B is a diagram illustrating an RF analog signal generated by the first signal generation circuit of FIG. 12A.
Figure 12C:
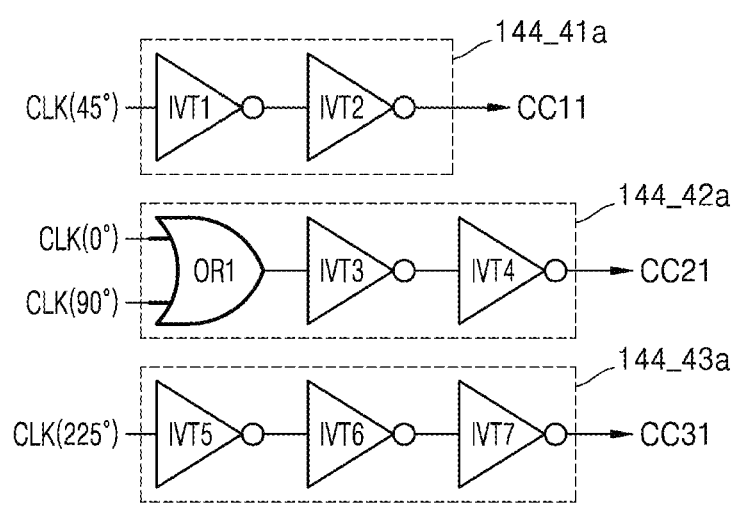
FIG. 12C is a diagram of an example implementation of first through third component signal generation logics in FIG. 12A.

FIG. 12A is a block diagram of a first signal generation circuit 144_4a_1 corresponding to the first signal generation circuit 144_4a in FIG. 11, FIG. 12B is a diagram illustrating an RF analog signal generated by the first signal generation circuit 144_4a_1 of FIG. 12A, and FIG. 12C is a diagram of an example implementation of first through third component signal generation logics 144_41a, 144_42a, and 144_43a in FIG. 12A.

Referring to FIG. 12A, the first signal generation circuit 144_4a_1 may include the first through third component signal generation logics 144_41a through 144_43a. The first through third component signal generation logics 144_41a through 144_43a may output first through third component signals CC11, CC21, and CC31 forming the first pattern PT_1 in FIG. 10, respectively. An output end of each of the first through third component signal generation logics 144_41a through 144_43a may be connected to a multiplexer 144_3_1.

The first component signal CC11 may be selected and output by the multiplexer 144_3_1 as a first pattern signal corresponding to a pattern of an I-Q binary data pair among the first pattern signals PT_S1[1] through PT_S1[k], based on a control signal of the control circuit 144_3 in FIG. 11, wherein the control signal corresponds to the pattern of an I-Q binary data pair. The second component signal CC21 may be selected and output by the multiplexer 144_3_1 as a second pattern signal corresponding to a pattern of an I-Q binary data pair among the second pattern signals PT_S2[1] through PT_S2[k], based on the control signal. The third component signal CC31 may be selected and output by the multiplexer 144_3_1 as a third pattern signal corresponding to a pattern of an I-Q binary data pair among the third pattern signals PT_S3[1] through PT_S3[k], based on the control signal. In other words, the multiplexer 144_5 may be configured to selectively connect at least one of the first through fourth signal generation circuits 144_4a through 144_4d to the SC-DAC 160 based on the pattern of the I-Q binary data pair.

Referring further to FIG. 12B, the first component signal CC11 may have a duty ratio of 1/4, the second component signal CC21 may have a duty ratio of 1/2, and the third component signal CC31 may have a duty ratio of 3/4. The first through third component signals CC11 through CC31 may have the same frequency (e.g., the carrier frequency of an RF analog signal). Each of the first through third component signals CC11 through CC31 may have a certain phase difference from one another, as shown in FIG. 12B, so that the RF analog signal $RF_{OUT}$ may have the first pattern PT_1 in FIG. 10. In an example embodiment, the magnitude of the second RF signal RF2, which is generated when the second component signal CC21 has passed through the second SC-DAC circuit 164a_1 in FIG. 6, may be $\sqrt{2}$ times the magnitude of each of the first RF signal RF1, which is generated when the first component signal CC11 has passed through the first SC-DAC circuit 162a_1 in FIG. 6, and the third RF signal RF3, which is generated when the third component signal CC31 has passed through the third SC-DAC circuit 166a_1 in FIG. 6.

Referring further to FIG. 12C, the first component signal generation logic 144_41a may include a first inverter IVT1 and a second inverter IVT2. The clock signal CLK(45°) having a duty ratio of 1/4 and a phase of 45 degrees is input to the first inverter IVT1. The second component signal generation logic 144_42a may include a first OR logic OR1, a third inverter IVT3, and a fourth inverter IVT4. The clock signal CLK(0°) having a duty ratio of 1/4 and a phase of 0 degrees and the clock signal CLK(90°) having a duty ratio of 1/4 and a phase of 90 degrees are input to the first OR logic OR1. The third component signal generation logic 144_43a may include a fifth inverter IVT5, a sixth inverter IVT6, and a seventh inverter IVT7. The clock signal CLK (225°) having a duty ratio of 1/4 and a phase of 225 degrees is input to the fifth inverter IVT5. The first through third component signal generation logics 144_41a through 144_43a may respectively generate the first through third component signals CC11 through CC31.

Figure 13A:
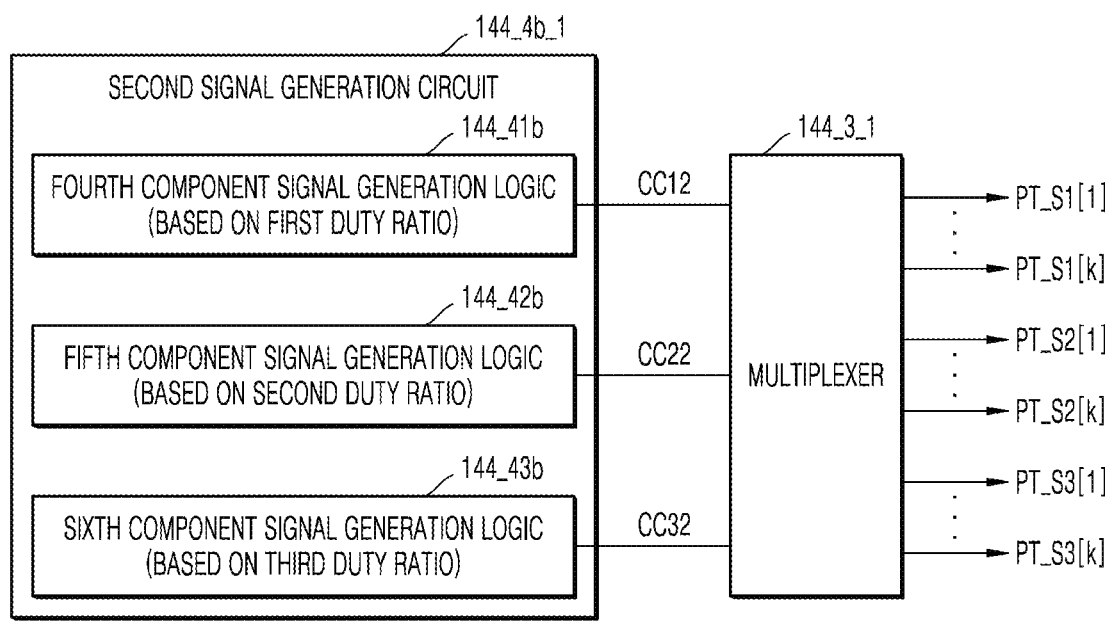
FIG. 13A is a block diagram of a second signal generation circuit in FIG. 11.
Figure 13B:
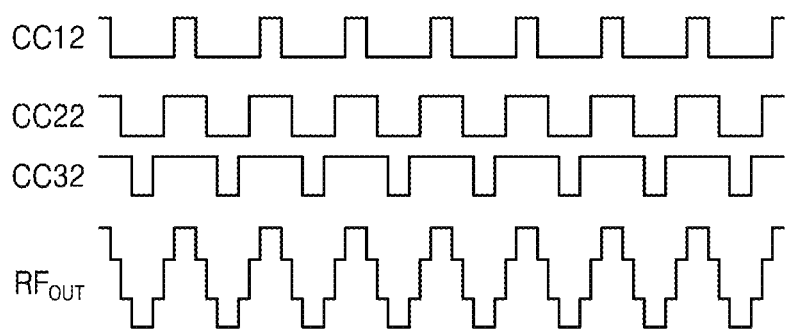
FIG. 13B is a diagram illustrating an RF analog signal generated by the second signal generation circuit of FIG. 13A.
Figure 13C:
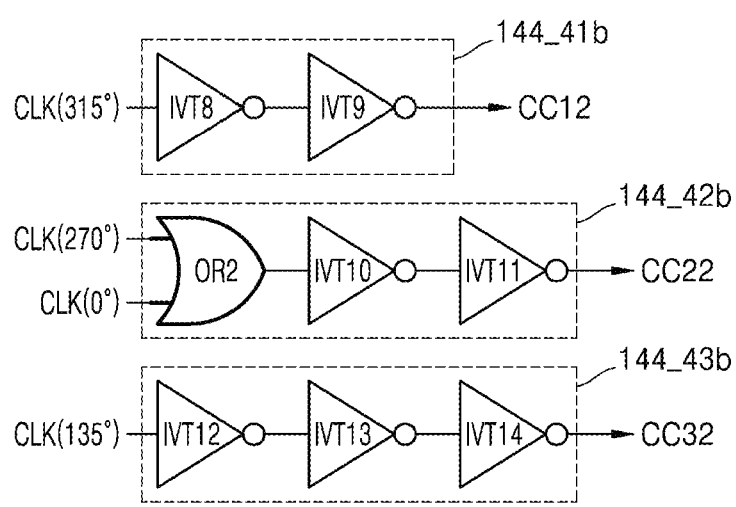
FIG. 13C is a diagram of an example implementation of fourth through six component signal generation logics in FIG. 13A.

FIG. 13A is a block diagram of a second signal generation circuit 144_4b_1 corresponding to the second signal generation circuit 144_4b in FIG. 11, FIG. 13B is a diagram illustrating an RF analog signal generated by the second signal generation circuit 144_4b_1 of FIG. 13A, and FIG. 13C is a diagram of an example implementation of fourth through sixth component signal generation logics 144_41b, 144_42b, and 144_43b in FIG. 13A.

Referring to FIG. 13A, the second signal generation circuit 144_4b_1 may include the fourth through sixth component signal generation logics 144_41b through 144_43b. The fourth through sixth component signal generation logics 144_41b through 144_43b may output fourth through sixth component signals CC12, CC22, and CC32 forming the second pattern PT_2 in FIG. 10, respectively. An output end of each of the fourth through sixth component signal generation logics 144_41b through 144_43b may be connected to the multiplexer 144_3_1.

The fourth component signal CC12 may be selected and output by the multiplexer 144_3_1 as a first pattern signal corresponding to a pattern of an I-Q binary data pair among the first pattern signals PT_S1[1] through PT_S1[k], based on a control signal of the control circuit 144_3 in FIG. 11, wherein the control signal corresponds to the pattern of an I-Q binary data pair. The fifth component signal CC22 may be selected and output by the multiplexer 144_3_1 as a second pattern signal corresponding to a pattern of an I-Q binary data pair among the second pattern signals PT_S2[1] through PT_S2[k], based on the control signal. The sixth component signal CC32 may be selected and output by the multiplexer 144_3_1 as a third pattern signal corresponding to a pattern of an I-Q binary data pair among the third pattern signals PT_S3[1] through PT_S3[k], based on the control signal.

Referring further to FIG. 13B, the fourth component signal CC12 may have a duty ratio of 1/4, the fifth component signal CC22 may have a duty ratio of 1/2, and the sixth component signal CC32 may have a duty ratio of 3/4. The fourth through sixth component signals CC12 through CC32 may have the same frequency (e.g., the carrier frequency of an RF analog signal). Each of the fourth through sixth component signals CC12 through CC32 may have a certain phase difference from one another, as shown in FIG. 13B, so that the RF analog signal $RF_{OUT}$ may have the second pattern PT_2 in FIG. 10. In an example embodiment, the magnitude of the second RF signal RF2, which is generated when the fifth component signal CC22 has passed through the second SC-DAC circuit 164a_1 in FIG. 6, may be $\sqrt{2}$ times the magnitude of each of the first RF signal RF1, which is generated when the fourth component signal CC12 has passed through the first SC-DAC circuit 162a_1 in FIG. 6, and the third RF signal RF3, which is generated when the sixth component signal CC32 has passed through the third SC-DAC circuit 166a_1 in FIG. 6.

Referring further to FIG. 13C, the fourth component signal generation logic 144_41b may include an eighth inverter IVT8 and a ninth inverter IVT9. The clock signal CLK(315°) having a duty ratio of 1/4 and a phase of 315 degrees is input to the eighth inverter IVT8. The fifth component signal generation logic 144_42b may include a second OR logic OR2, a tenth inverter IVT10, and an eleventh inverter IVT11. The clock signal CLK(270°) having a duty ratio of 1/4 and a phase of 270 degrees and the clock signal CLK(0°) having a duty ratio of 1/4 and a phase of 0 degrees are input to the second OR logic OR2. The sixth component signal generation logic 144_43b may include a twelfth inverter IVT12, a 13th inverter IVT13, and a 14th inverter IVT14. The clock signal CLK(135°) having a duty ratio of 1/4 and a phase of 135 degrees is input to the twelfth inverter IVT12. The fourth through sixth component signal generation logics 144_41b through 144_43b may respectively generate the fourth through sixth component signals CC12 through CC32.

Figure 14A:
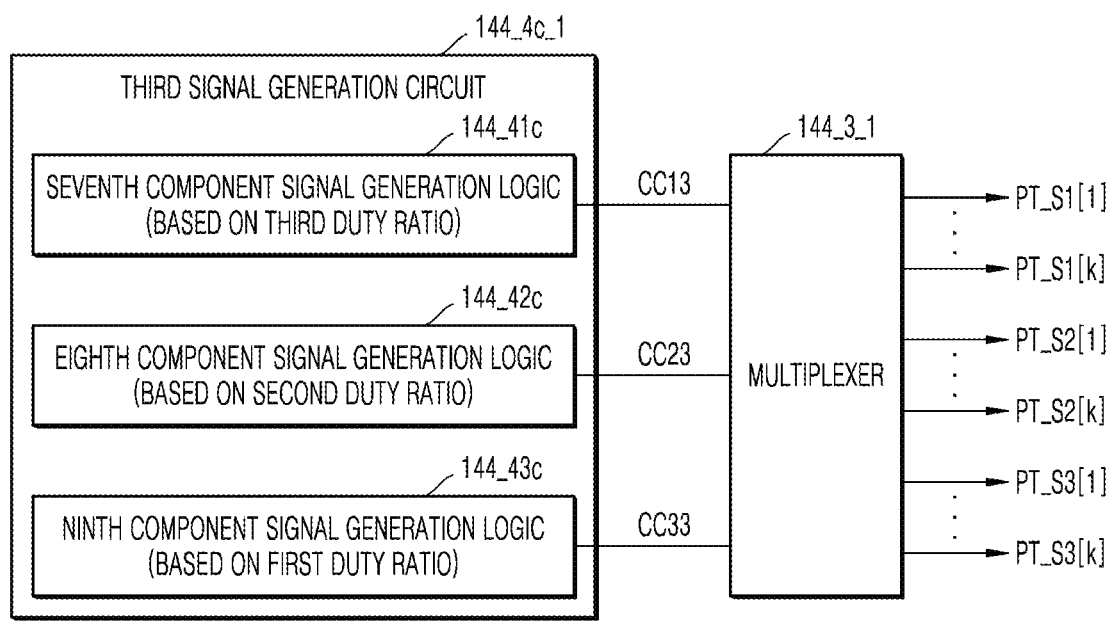
FIG. 14A is a block diagram of a third signal generation circuit in FIG. 11.
Figure 14B:
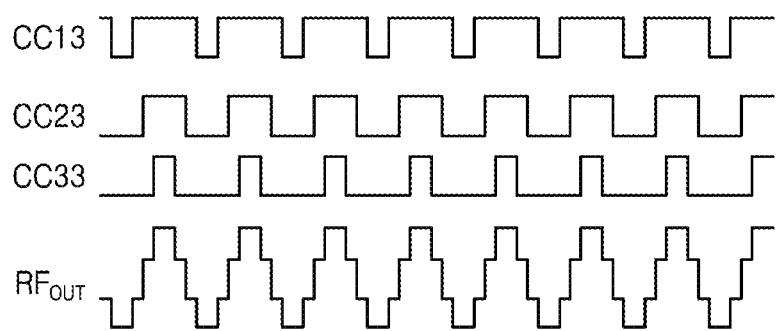
FIG. 14B is a diagram illustrating an RF analog signal generated by the third signal generation circuit of FIG. 14A.
Figure 14C:
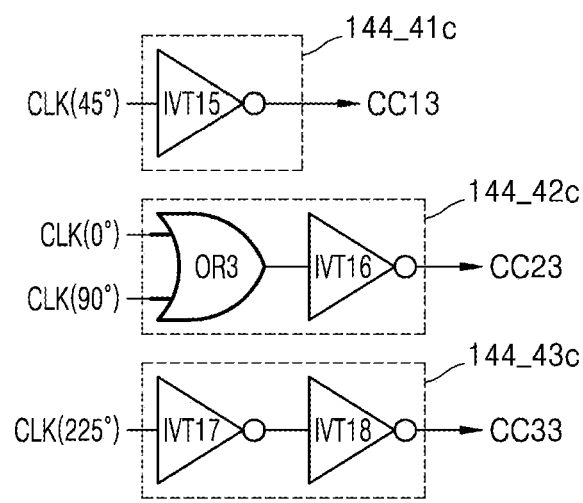
FIG. 14C is a diagram of an example implementation of seventh through ninth component signal generation logics in FIG. 14A.

FIG. 14A is a block diagram of a third signal generation circuit 144_4c_1 corresponding to the third signal generation circuit 144_4c in FIG. 11, FIG. 14B is a diagram illustrating an RF analog signal generated by the third signal generation circuit 144_4c_1 of FIG. 14A, and FIG. 14C is a diagram of an example implementation of seventh through ninth component signal generation logics 144_41c, 144_42c, and 144_43c in FIG. 14A.

Referring to FIG. 14A, the third signal generation circuit 144_4c_1 may include the seven through ninth component signal generation logics 144_41c through 144_43c. The seven through ninth component signal generation logics 144_41c through 144_43c may output seven through ninth component signals CC13, CC23, and CC33 forming the third pattern PT_4 in FIG. 10, respectively. An output end of each of the seven through ninth component signal generation logics 144_41c through 144_43c may be connected to the multiplexer 144_3_1.

The seventh component signal CC13 may be selected and output by the multiplexer 144_3_1 as a first pattern signal corresponding to a pattern of an I-Q binary data pair among the first pattern signals PT_S1[1] through PT_S1[k], based on a control signal of the control circuit 144_3 in FIG. 11, wherein the control signal corresponds to the pattern of an I-Q binary data pair. The eighth component signal CC23 may be selected and output by the multiplexer 144_3_1 as a second pattern signal corresponding to a pattern of an I-Q binary data pair among the second pattern signals PT_S2[1] through PT_S2[k], based on the control signal. The ninth component signal CC33 may be selected and output by the multiplexer 144_3_1 as a third pattern signal corresponding to a pattern of an I-Q binary data pair among the third pattern signals PT_S3[1] through PT_S3[k], based on the control signal.

Referring further to FIG. 14B, the seventh component signal CC13 may have a duty ratio of 3/4, the eighth component signal CC23 may have a duty ratio of 1/2, and the ninth component signal CC33 may have a duty ratio of 1/4. The seventh through ninth component signals CC13 through CC33 may have the same frequency, i.e., the carrier frequency of an RF analog signal. Each of the seventh through ninth component signals CC13 through CC33 may have a certain phase difference from one another, as shown in FIG. 14B, so that the RF analog signal $RF_{OUT}$ may have the third pattern PT_3 in FIG. 10. In an example embodiment, the magnitude of the second RF signal RF2, which is generated when the eighth component signal CC23 has passed through the second SC-DAC circuit 164a_1 in FIG. 6, may be $\sqrt{2}$ times the magnitude of each of the first RF signal RF1, which is generated when the seventh component signal CC13 has passed through the first SC-DAC circuit 162a_1 in FIG. 6, and the third RF signal RF3, which is generated when the ninth component signal CC33 has passed through the third SC-DAC circuit 166a_1 in FIG. 6.

Referring further to FIG. 14C, the seventh component signal generation logic 144_41c may include a fifth inverter IVT15, to which the clock signal CLK(45°) having a duty ratio of 1/4 and a phase of 45 degrees is input. The eighth component signal generation logic 144_42c may include a third OR logic OR3 and a 16th inverter IVT16. The clock signal) CLK(0° having a duty ratio of 1/4 and a phase of 0 degrees and the clock signal CLK(90°) having a duty ratio of 1/4 and a phase of 90 degrees are input to the third OR logic OR3. The ninth component signal generation logic 144_43c may include a 17th inverter IVT17 and an 18th inverter IVT18. The clock signal CLK(225°) having a duty ratio of 1/4 and a phase of 225 degrees is input to the 17th inverter IVT17. The seven through ninth component signal generation logics 144_41c through 144_43c may respectively generate the seventh through ninth component signals CC13 through CC33.

Figure 15A:
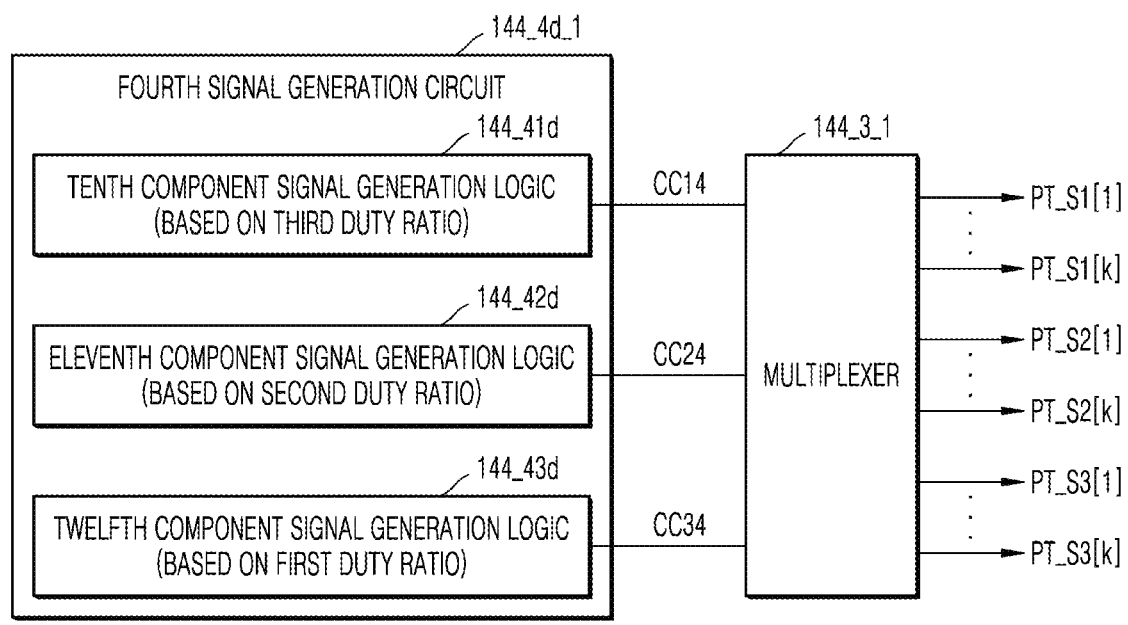
FIG. 15A is a block diagram of a fourth signal generation circuit in FIG. 11.
Figure 15B:
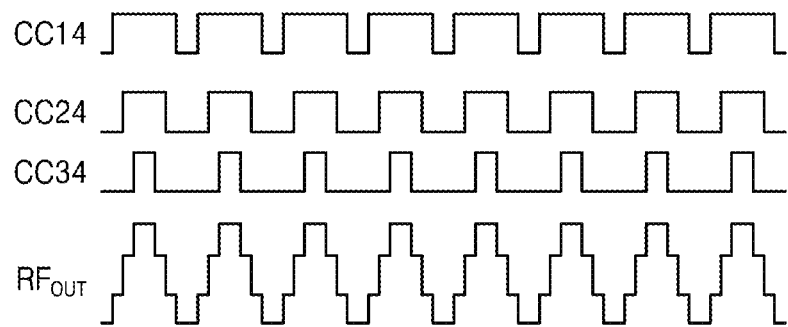
FIG. 15B is a diagram illustrating an RF analog signal generated by the fourth signal generation circuit of FIG. 15A.
Figure 15C:
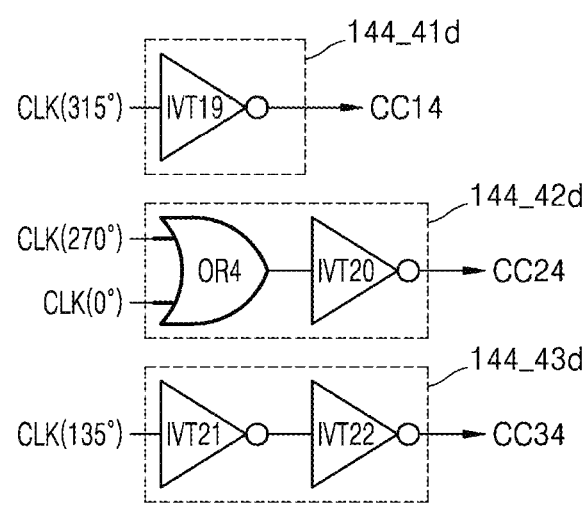
FIG. 15C is a diagram of an example implementation of tenth through twelfth component signal generation logics in FIG. 15A.

FIG. 15A is a block diagram of a fourth signal generation circuit 144_4d_1 corresponding to the fourth signal generation circuit 144_4d in FIG. 11, FIG. 15B is a diagram illustrating an RF analog signal generated by the fourth signal generation circuit 144_4d_1 of FIG. 15A, and FIG. 15C is a diagram of an example implementation of tenth through twelfth component signal generation logics 144_41d, 144_42d, and 144_43d in FIG. 15A.

Referring to FIG. 15A, the fourth signal generation circuit 144_4d_1 may include the tenth through twelfth component signal generation logics 144_41d through 144_43d. The tenth through twelfth component signal generation logics 144_41d through 144_43d may respectively output tenth through twelfth component signals CC14, CC24, and CC34 forming the fourth pattern PT_4 in FIG. 10, respectively. An output end of each of the first through third component signal generation logics 144_41a through 144_43a may be connected to the multiplexer 144_3_1.

The tenth component signal CC14 may be selected and output by the multiplexer 144_3_1 as a first pattern signal corresponding to a pattern of an I-Q binary data pair among the first pattern signals PT_S1[1] through PT_S1[k], based on a control signal of the control circuit 144_3 in FIG. 11, wherein the control signal corresponds to the pattern of an I-Q binary data pair. The eleventh component signal CC24 may be selected and output by the multiplexer 144_3_1 as a second pattern signal corresponding to a pattern of an I-Q binary data pair among the second pattern signals PT_S2[1] through PT_S2[k], based on the control signal. The twelfth component signal CC34 may be selected and output by the multiplexer 144_3_1 as a third pattern signal corresponding to a pattern of an I-Q binary data pair among the third pattern signals PT_S3[1] through PT_S3[k], based on the control signal.

Referring further to FIG. 15B, the tenth component signal CC14 may have a duty ratio of 3/4, the eleventh component signal CC24 may have a duty ratio of 1/2, and the twelfth component signal CC34 may have a duty ratio of 1/4. The tenth through twelfth component signals CC14 through CC34 may have the same frequency, i.e., the carrier frequency of an RF analog signal. Each of the tenth through twelfth component signals CC14 through CC34 may have a certain phase difference from one another, as shown in FIG. 15B, so that the RF analog signal $RF_{OUT}$ may have the fourth pattern PT_4 in FIG. 10. In an example embodiment, the magnitude of the second RF signal RF2, which is generated when the eleventh component signal CC24 has passed through the second SC-DAC circuit 164a_1 in FIG. 6, may be $\sqrt{2}$ times the magnitude of each of the first RF signal RF1, which is generated when the tenth component signal CC14 has passed through the first SC-DAC circuit 162a_1 in FIG. 6, and the third RF signal RF3, which is generated when the twelfth component signal CC34 has passed through the third SC-DAC circuit 166a_1 in FIG. 6.

Referring further to FIG. 15C, the tenth component signal generation logic 144_41d may include a 19th inverter IVT19, to which the clock signal CLK(315°) having a duty ratio of 1/4 and a phase of 315 degrees is input. The eleventh component signal generation logic 144_42d may include a fourth OR logic OR4 and a 20th inverter IVT20. The clock signal) CLK(270° having a duty ratio of 1/4 and a phase of 270 degrees and the clock signal CLK(0°) having a duty ratio of 1/4 and a phase of 0 degrees are input to the fourth OR logic OR4. The twelfth component signal generation logic 144_43d may include a 21st inverter IVT21 and a 22nd inverter IVT22. The clock signal CLK(135°) having a duty ratio of 1/4 and a phase of 135 degrees is input to the 21st inverter IVT21. The tenth through twelfth component signal generation logics 144_41d through 144_43d may respectively generate the tenth through twelfth component signals CC14 through CC34.

Figure 16:
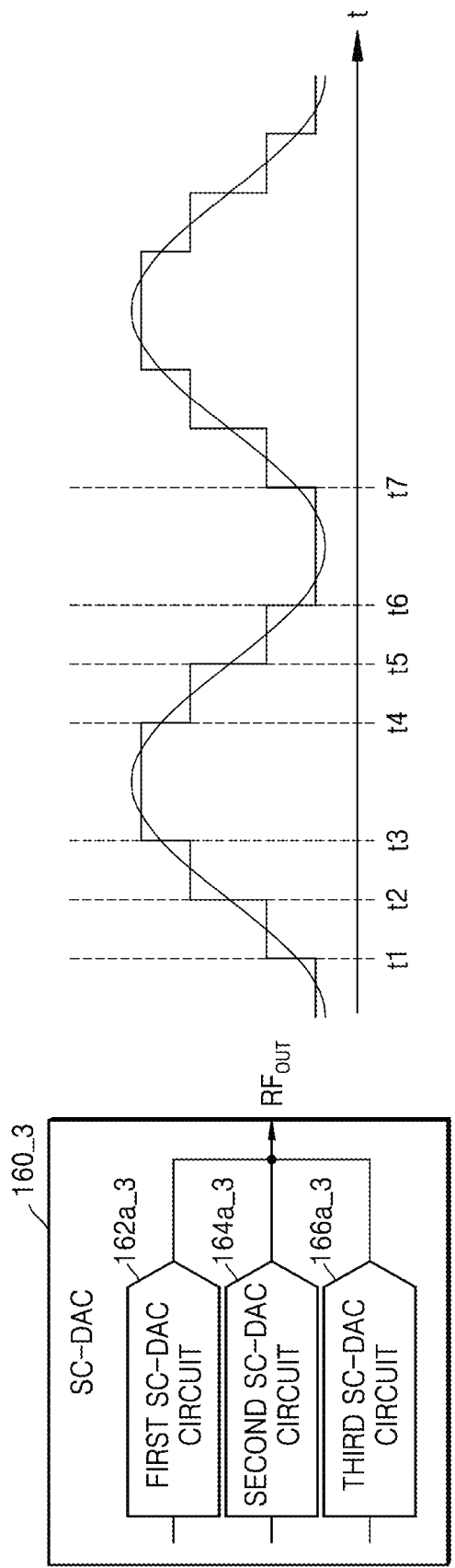
FIG. 16 is a diagram for describing an operation of an SC-DAC, according to an example embodiment.

FIG. 16 is a diagram for describing an operation of an SC-DAC 160_3, according to an example embodiment.

Referring to FIG. 16, the SC-DAC 160_3 may include first through third SC-DAC circuits 162a_3, 164a_3, and 166a_3, and output the RF analog signal $RF_{OUT}$ resulting from summation of first through third RF signals, which are output from the first through third SC-DAC circuits 162a_3, 164a_3, and 166a_3, respectively. In an example embodiment, the first SC-DAC circuit 162a_3 may output the first RF signal having a rectangular pulse at a duty ratio of 1/4 during a period from a third time t3 to a fourth time t4, the second SC-DAC circuit 164a_3 may output the second RF signal having a rectangular pulse at a duty ratio of 1/2 during a period from a second time t2 to a fifth time t5, and the third SC-DAC circuit 166a_3 may output the third RF signal having a rectangular pulse at a duty ratio of 3/4 during a period from a first time t1 to a sixth time t6, so that the SC-DAC 160_3 may output the RF analog signal $RF_{OUT}$ that is close to a sine signal.

Figure 17:
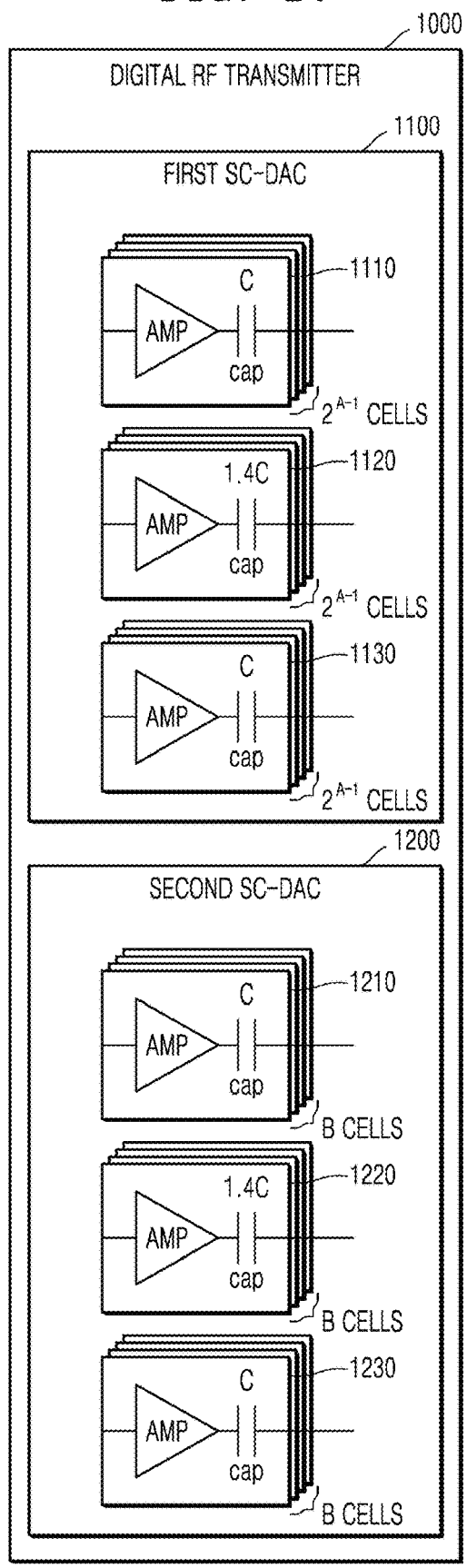
FIG. 17 is a diagram of the configuration of a digital RF transmitter according to an example embodiment.

FIG. 17 is a diagram of the configuration of a digital RF transmitter 1000 according to an example embodiment.

Referring to FIG. 17, the digital RF transmitter 1000 may include a first SC-DAC 1100 and a second SC-DAC 1200. The first SC-DAC 1100 may include first through third SC-DAC circuits 1110, 1120, and 1130. Each of the first and third SC-DAC circuits 1110 and 1130 may include $2^{A-1}$ cells each including an amplifier AMP and a capacitor Cap having a capacitance C. The second SC-DAC circuit 1120 may include $2^{A-1}$ cells each including the amplifier AMP and the capacitor Cap having a capacitance 1.4C. The second SC-DAC 1200 may include fourth through sixth SC-DAC circuits 1210, 1220, and 1230. The fourth and sixth SC-DAC circuits 1210 and 1230 may include B cells each including the amplifier AMP and the capacitor Cap having the capacitance C. The fifth SC-DAC circuit 1220 may include B cells each including the amplifier AMP and the capacitor Cap having the capacitance 1.4C.

When a modem (not shown) generates a digital signal having "k" bits, the first SC-DAC 1100 may receive thermometer-to-binary data, into which a digital signal having A bits among the "k" bits is converted, in the configuration described above and may perform the conversion operation described above with reference to FIGS. 1 through 16. The second SC-DAC 1200 may receive a digital signal having B bits among the "k" bits and perform the conversion operation described above with reference to FIGS. 1 through 16. For example, the A bits may correspond to most significant bits (MSBs) among the "k" bits, and the B bits may correspond to least significant bits (LSBs) among the "k" bits.

When all SC-DACs of the digital RF transmitter 1000 are configured to receive thermometer-to-binary data, the number of cells including the amplifier AMP and the capacitor Cap rapidly increases, making it difficult to reduce the size of the digital RF transmitter 1000. Therefore, when only some SC-DACs, e.g., only the first SC-DAC 1100, in the digital RF transmitter 1000 is configured to receive thermometer-to-binary data as shown in FIG. 17, the linearity of operations may be ensured and the size of the digital RF transmitter 1000 may also be reduced.

Figure 18:
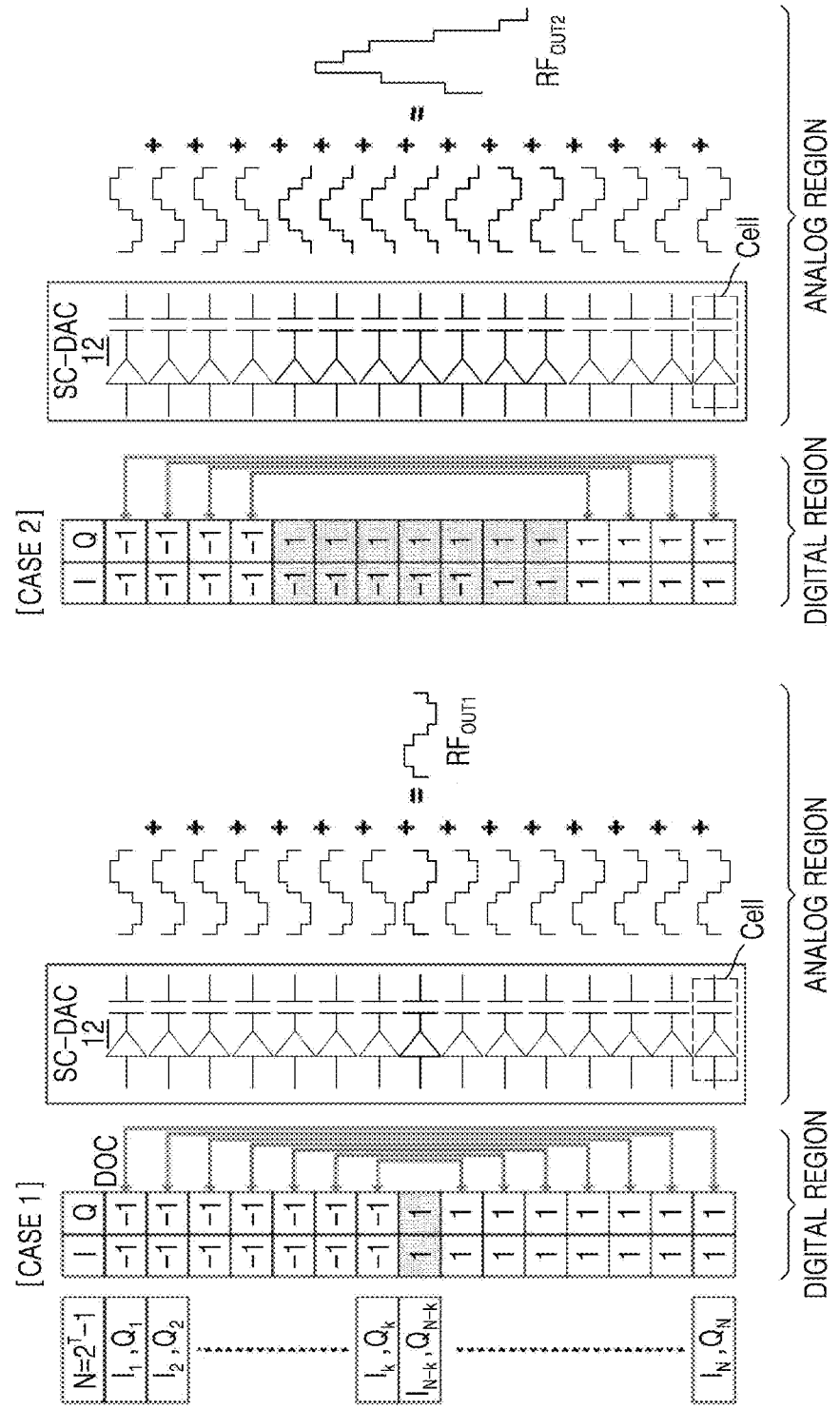
FIG. 18 is a diagram of an example of applying a deactivation of opposite cell (DOC) logic to the wireless communication device of FIG. 1, wherein the DOC logic may be applied to the wireless communication device to reduce or minimize the power consumption of an SC-DAC.

FIG. 18 is a diagram of an example of applying a deactivation of opposite cell (DOC) logic to the wireless communication device 1 of FIG. 1. The DOC logic may be applied to the wireless communication device 1 to reduce or minimize the power consumption of the SC-DAC 12.

Referring to FIGS. 1 and 18, after N patterns of I-Q binary data pairs are calculated in advance in a digital region in which the modem 30 operates, some cells, each of which includes an amplifier and a capacitor, in the SC-DAC 12 are deactivated and the other cells are activated in an analog region, so that power consumption may be reduced or minimized.

In other words, because a pattern of "1,1" and a pattern of "−1,−1" (hereinafter, systematically expressed as ±1) cancel each other when passing through the SC-DAC 12, the modem 30 may detect in advance the numbers of patterns of "1,1" and patterns of "−1,−1" among the N patterns and thus determine the number of cells to be deactivated.

In a first case [CASE1], one pattern of "1,1" remains after patterns among the N patterns cancel each other, and therefore, the modem 30 may activate only one cell of the SC-DAC 12, and the SC-DAC 12 may output a first RF analog signal $RF_{OUT1}$.

In a second case [CASE2], five patterns of "−1,1" and two patterns of "1,1" remain after patterns among the N patterns cancel each other, and therefore, the modem 30 may activate seven cells respectively corresponding to the remaining patterns among the cells of the SC-DAC 12, and the SC-DAC 12 may output a second RF analog signal $RF_{OUT2}$.

Figure 19:
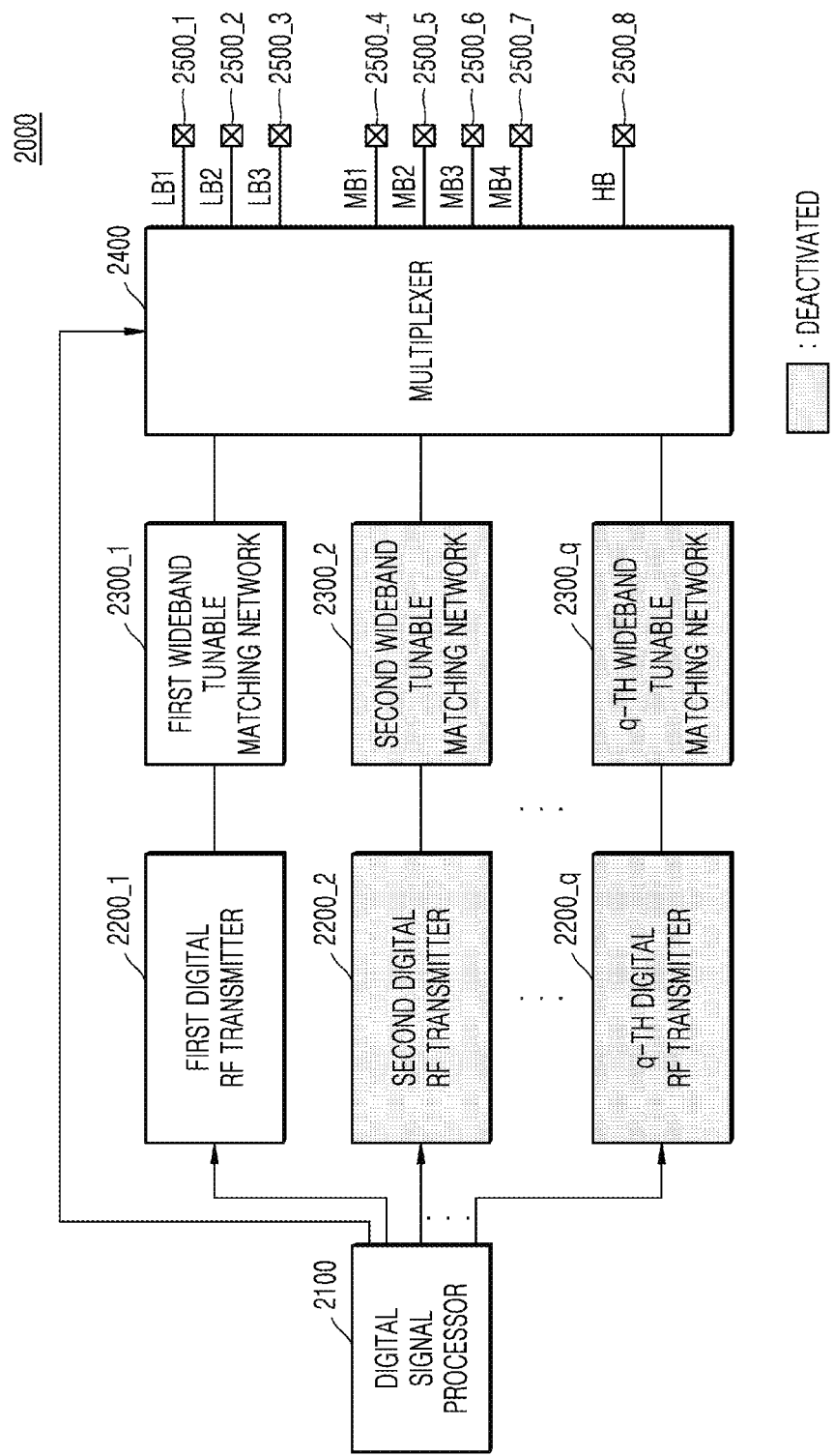
FIG. 19 is a block diagram of a wireless communication device, according to an example embodiment.

FIG. 19 is a block diagram of a wireless communication device 2000, according to an example embodiment.

Referring to FIG. 19, the wireless communication device 2000 may include a digital signal processor 2100, first through q-th digital RF transmitters 2200_1 through 2200_$q$, first through q-th wideband tunable matching networks 2300_1 through 2300_$q$, a multiplexer 2400, and a plurality of output terminals, e.g., first through eighth output terminals 2500_1 through 2500_8. The embodiments described above with reference to FIGS. 1 through 18 may be applied to the first through q-th digital RF transmitters 2200_1 through 2200_$q$. Each of the first through q-th wideband tunable matching networks 2300_1 through 2300_$q$ may include a balun (not shown) and a PA (not shown), which are suitable for a corresponding one of the first through q-th digital RF transmitters 2200_1 through 2200_$q$ respectively connected to the first through q-th wideband tunable matching networks 2300_1 through 2300_$q$. The first through q-th wideband tunable matching networks 2300_1 through 2300_$q$ may not include a filter that removes an intermodulation distortion component generated by a PA. Among the first through eighth output terminals 2500_1 through 2500_8, the first through third output terminals 2500_1 through 2500_3 may respectively correspond to first through third low bands LB1 through LB3, the fourth through seventh output terminals 2500_4 through 2500_7 may respectively correspond to first through fourth midbands MB1 through MB4, and the eighth output terminal 2500_8 may correspond to a high band HB. However, the configuration of the wireless communication device 2000 of FIG. 19 is just an example embodiment, and the embodiments are not limited thereto. A wireless communication device may be implemented to support communications in various frequency bands.

In an example embodiment, when operating in a time division duplex mode, the digital signal processor 2100 may select one of the first through q-th digital RF transmitters 2200_1 through 2200_$q$ and provide a baseband digital signal to the selected digital RF transmitter as an IQ signal. Hereinafter, it is assumed that the digital signal processor 2100 has selected the first digital RF transmitter 2200_1. In some embodiments, the second through q-th digital RF transmitters 2200_2 through 2200_$q$, which have not been selected, and the second through q-th wideband tunable matching networks 2300_2 through 2300_$q$ may be deactivated.

The first digital RF transmitter 2200_1 may generate an RF analog signal, which corresponds to an I-Q pattern and a carrier frequency, and an inverted RF analog signal by operating in the same manner as in the embodiments described above to perform frequency up-conversion and digital-to-analog conversion on the baseband digital signal and may output the RF analog signal and the inverted RF analog signal to the first wideband tunable matching network 2300_1 connected thereto. The first wideband tunable matching network 2300_1 may generate an RF output signal using the received RF analog signal and inverted RF analog signal and may output the RF output signal through the multiplexer 2400 to an output terminal corresponding to the frequency band of the RF analog signal among the first through eighth output terminals 2500_1 through 2500_8. The digital signal processor 2100 may control a switching operation of the multiplexer 2400.

While the inventive concepts have been particularly shown and described with reference to some example embodiments thereof, it will be understood that various changes in form and details may be made with regard to the disclosed example embodiments without departing from the spirit and scope of the following claims.

What is claimed is:

1. A digital radio frequency (RF) transmitter comprising:
   processing circuitry configured to generate first, second, and third pattern signals based on a pattern of an inphase (I)-quadrature (Q) binary data pair and a pattern of an inverted I-Q binary data pair, the first through third pattern signals having a same pattern and different phases; and a switched-capacitor digital-to-analog converter (SC-DAC) configured to remove an n-th harmonic component of an RF analog signal by amplifying the first through third pattern signals to have a certain magnitude ratio and synthesizing the amplified first through third pattern signals into the RF analog signal, where "n" is an integer of at least 3, wherein when the n-th harmonic component is a third harmonic component, a phase of the first pattern signal leads a phase of the second pattern signal by 45 degrees and a phase of the third pattern signal by 90 degrees, wherein the SC-DAC includes,
   a first SC-DAC circuit configured to receive and amplify the first pattern signal and output the amplified first pattern signal through an output terminal,
   a second SC-DAC circuit configured to receive and amplify the second pattern signal and output the amplified second pattern signal through the output terminal, and
   a third SC-DAC circuit configured to receive and amplify the third pattern signal and output the amplified third pattern signal through the output terminal, and wherein an equivalent capacitance of the second SC-DAC circuit is 1.4 times an equivalent capacitance of each of the first SC-DAC circuit and the third SC-DAC circuit.

2. The digital RF transmitter of claim 1, wherein a first supply voltage applied to the second SC-DAC circuit is greater than a second supply voltage applied to each of the first SC-DAC circuit and the third SC-DAC circuit.

3. The digital RF transmitter of claim 2, wherein the first supply voltage is variable.

4. The digital RF transmitter of claim 1, further comprising:
a thermometer-to-binary converter configured to receive "k" bits of I data, "k" bits of Q data, "k" bits of inverted I data, and "k" bits of inverted Q data from a digital signal processor, convert the I data, the Q data, the inverted I data, and the inverted Q data into I binary data, Q binary data, inverted I binary data, and inverted Q binary data, respectively, and output the I binary data, the Q binary data, the inverted I binary data, and the inverted Q binary data to the processing circuitry, where "k" is an integer of at least 2.

5. The digital RF transmitter of claim 4, wherein the processing circuitry is further configured to,
generate a plurality of clock signals having a duty ratio and different phases from each other; and
generate the first through third pattern signals by multiplying the plurality of clock signals by the I binary data, the Q binary data, the inverted I binary data, and the inverted Q binary data.

6. The digital RF transmitter of claim 5, wherein
the plurality of clock signals include a first clock signal having a phase of 0 degree, a second clock signal having a phase of 45 degrees, a third clock signal having a phase of 90 degrees, a fourth clock signal having a phase of 135 degrees, a fifth clock signal having a phase of 180 degrees, a sixth clock signal having a phase of 225 degrees, a seventh clock signal having a phase of 270 degrees, and an eighth clock signal having a phase of 315 degrees, and
the processing circuitry is configured to
generate the first pattern signal by first-multiplying the first clock signal by the I binary data, the third clock signal by the Q binary data, the fifth clock signal by the inverted I binary data, and the seventh clock signal by the inverted Q binary data and summing results of the first-multiplying,
generate the second pattern signal by second-multiplying the second clock signal by the I binary data, the fourth clock signal by the Q binary data, the sixth clock signal by the inverted I binary data, and the eighth clock signal by the inverted Q binary data and summing results of the second-multiplying, and
generate the third pattern signal by third-multiplying the third clock signal by the I binary data, the fifth clock signal by the Q binary data, the seventh clock signal by the inverted I binary data, and the first clock signal by the inverted Q binary data and summing results of the third-multiplying.

7. The digital RF transmitter of claim 4, wherein the processing circuitry is further configured to,
generate a plurality of clock signals having a duty ratio and different phases from each other, and
generate the first through third pattern signals by using at least one of the plurality of clock signals.

8. The digital RF transmitter of claim 7, wherein the processing circuitry includes:
a first signal generation circuit configured to generate component signals respectively output as the first through third pattern signals when the pattern of the I-Q binary data pair is a first pattern;
a second signal generation circuit configured to generate component signals respectively output as the first through third pattern signals when the pattern of the I-Q binary data pair is a second pattern;
a third signal generation circuit configured to generate component signals respectively output as the first through third pattern signals when the pattern of the I-Q binary data pair is a third pattern; and
a fourth signal generation circuit configured to generate component signals respectively output as the first through third pattern signals, when the pattern of the I-Q binary data pair is a fourth pattern.

9. The digital RF transmitter of claim 8, wherein each of the first through fourth signal generation circuits includes:
a first component signal generation logic configured to generate a first component signal having a first duty ratio;
a second component signal generation logic configured to generate a second component signal having a second duty ratio; and
a third component signal generation logic configured to generate a third component signal having a third duty ratio.

10. The digital RF transmitter of claim 9, wherein the first duty ratio is 1/4, the second duty ratio is 1/2, and the third duty ratio is 3/4.

11. The digital RF transmitter of claim 1, wherein
the processing circuitry is further configured to generate first through third inverted pattern signals by inverting the first through third pattern signals, and
the SC-DAC is further configured to remove an n-th harmonic component of an inverted RF analog signal by amplifying the first through third inverted pattern signals to have a certain magnitude ratio and synthesizing the amplified first through third inverted pattern signals into the inverted RF analog signal.

12. A wireless communication device comprising:
a modem configured to modulate digital data and output "k" bits of inphase (I) data, "k" bits of quadrature (Q) data, "k" bits of inverted I data, and "k" bits of inverted Q data, where "k" is an integer of at least 2;

a digital radio frequency (RF) transmitter configured to,
generate a first pattern signal having a pattern corresponding to a pattern of an I-Q binary data pair and a pattern of an inverted I-Q binary data pair, the I-Q binary data pair and the inverted I-Q binary data pair being generated based on thermometer-to-binary conversion on the I data, the Q data, the inverted I data, and the inverted Q data, and
remove an n-th harmonic component of an RF analog signal by generating a second pattern signal and a third pattern signal, the second pattern signal having a first phase difference from the first pattern signal, and the third pattern signal having a second phase difference from the first pattern signal, where "n" is an integer of at least 3; and
a power amplifier configured to receive the RF analog signal and to generate an RF output signal by amplifying the RF analog signal, the RF analog signal being generated by summing the first through third pattern signals,
wherein when the n-th harmonic component is a third harmonic component, a phase of the first pattern signal leads a phase of the second pattern signal by 45 degrees and a phase of the third pattern signal by 90 degrees, and
a magnitude of the second pattern signal is $\sqrt{2}$ times a magnitude of each of the first pattern signal and the third pattern signal.

13. The wireless communication device of claim 12, wherein
the digital RF transmitter includes a first capacitor passing the first pattern signal, a second capacitor passing the second pattern signal, and a third capacitor passing the third pattern signal, and
a capacitance of the second capacitor is $\sqrt{2}$ times a capacitance of each of the first capacitor and a second capacitor.

14. The wireless communication device of claim 12, wherein the digital RF transmitter is configured to generate a first component signal having a duty ratio of 1/4 as the first pattern signal, a second component signal having a duty ratio of 1/2 as the second pattern signal, and a third component signal having a duty ratio of 3/4 as the third pattern signal by using at least one of a plurality of clock signals having the duty ratio of 1/4 and different phases from each other.

15. A wireless communication device comprising:
a first switched-capacitor digital-to-analog converter (SC-DAC) circuit including a plurality of first paths, each including a first amplifier and a first capacitor, the first SC-DAC circuit configured to receive a plurality of first pattern signals in parallel and output a first radio frequency (RF) signal by summing the plurality of first pattern signals;
a second SC-DAC circuit including a plurality of second paths, each including a second amplifier and a second capacitor, the second SC-DAC circuit configured to receive a plurality of second pattern signals in parallel and output a second RF signal by summing the plurality of second pattern signals;
a third SC-DAC circuit including a plurality of third paths, each including a third amplifier and a third capacitor, the third SC-DAC circuit configured to receive a plurality of third pattern signals in parallel and output a third RF signal by summing the plurality of third pattern signals;
processing circuitry configured to generate the plurality of first pattern signals based on patterns of inphase (I)-quadrature (Q) binary data pairs and patterns of inverted I-Q binary data pairs, the plurality of second pattern signals, and the plurality of third pattern signals, the plurality of second pattern signals lagging the plurality of first pattern signals by a first phase, and the plurality of third pattern signals lagging the plurality of first pattern signals by a second phase; and
a first output terminal connected to an output terminal of each of the first through third SC-DAC circuits and configured to output an RF analog signal by summing the first through third RF signals.

* * * * *